(12) United States Patent
Shmilovich et al.

(10) Patent No.: US 11,377,197 B2
(45) Date of Patent: Jul. 5, 2022

(54) HIGH LIFT SYSTEMS FOR AIRCRAFT AND RELATED METHODS

(71) Applicant: The Boeing Company, Chicago, IL (US)

(72) Inventors: Arvin Shmilovich, Huntington Beach, CA (US); Eric David Dickey, Long Beach, CA (US)

(73) Assignee: The Boeing Company, Chicago, IL (US)

( * ) Notice: Subject to any disclaimer, the term of this patent is extended or adjusted under 35 U.S.C. 154(b) by 312 days.

(21) Appl. No.: 16/507,999

(22) Filed: Jul. 10, 2019

(65) Prior Publication Data
US 2021/0009257 A1   Jan. 14, 2021

(51) Int. Cl.
*B64C 9/24* (2006.01)

(52) U.S. Cl.
CPC .................... *B64C 9/24* (2013.01)

(58) Field of Classification Search
CPC .... B64C 3/28; B64C 3/48; B64C 3/50; B64C 23/076; B64C 13/0425; B64C 2003/146
See application file for complete search history.

(56) References Cited

U.S. PATENT DOCUMENTS

| | | | | |
|---|---|---|---|---|
| 4,427,168 A * | 1/1984 | McKinney | ................ | B64C 3/48 244/214 |
| 5,158,252 A * | 10/1992 | Sakurai | .................... | B64C 3/48 244/213 |
| 8,534,611 B1 * | 9/2013 | Pitt | .......................... | B64C 3/50 244/214 |
| 9,896,190 B1 * | 2/2018 | Amorosi | ................ | B64C 21/02 |

* cited by examiner

*Primary Examiner* — Richard G Davis
(74) *Attorney, Agent, or Firm* — Hanley, Flight & Zimmerman, LLC

(57) ABSTRACT

High-lift systems and related methods are described. An example apparatus includes a fixed wing and a Krueger flap movably coupled to the fixed wing between a stowed position and a deployed position. The Krueger flap includes a first flap portion movably coupled to the fixed wing and a second flap portion movable coupled to the first flap portion. The first flap portion moves relative to the second flap portion between a retracted position and an extended position. The first flap is to move to the retracted position in response to the Krueger flap moving to the stowed position. The first flap is to move to the extended position to define an aerodynamic surface in response to the Krueger flap moving to the deployed position.

20 Claims, 15 Drawing Sheets

HIGH LIFT SYSTEMS FOR AIRCRAFT AND RELATED METHODS

FIELD OF THE DISCLOSURE

This disclosure relates generally to high-lift systems and, more specifically, to high-lift systems for aircraft and related methods.

BACKGROUND

High-lift systems, such as Krueger flaps, are lift enhancement devices for use with airfoils (e.g., wings) of aircraft. Krueger flaps are movable between a stowed position located at an underside of an airfoil to which the Krueger flap is coupled, and a deployed position in which at least a portion of the Krueger flap is located forward of a leading edge of the airfoil. When deployed, a Krueger flap increases a coefficient of lift associated with the airfoil at higher angles of attack. The deployment of Krueger flaps typically provides for improved (e.g., increased) handling of the aircraft at lower speeds (e.g., aircraft speeds of Mach 0.4 or less).

SUMMARY

An example apparatus includes a fixed wing and a Krueger flap movably coupled to the fixed wing between a stowed position and a deployed position. The Krueger flap includes a first flap portion movably coupled to the fixed wing and a second flap portion movable coupled to the first flap portion. The first flap portion moves relative to the second flap portion between a retracted position and an extended position. The first flap is to move to the retracted position in response to the Krueger flap moving to the stowed position. The first flap is to move to the extended position to define an aerodynamic surface in response to the Krueger flap moving to the deployed position.

In some examples, an apparatus includes a Krueger flap having a teardrop shaped aerodynamic surface. The Krueger flap including a first flap defining a first portion of the aerodynamic surface and a second flap movably coupled to the first flap between a first position and a second position. The second flap to move relative to the first position to facilitate storage of the Krueger flap in response to the Krueger flap moving toward a stowed position, the second flap to move to the second position to form the teardrop shaped aerodynamic surface of the Krueger flap in response to the Krueger flap moving toward a deployed position.

In some examples, a method includes moving a Krueger flap relative to an airfoil between a stowed position and a deployed position. In some examples, the method includes moving a first flap of the Krueger flap relative to a second flap of the Krueger flap between a first position and a second position. In some examples, the first flap and the second flap to form an aerodynamic surface of the Krueger flap having a teardrop shape profile in response to the Krueger flap moving to the deployed position and the second flap moving to the second position relative to the first flap.

Figure 1:
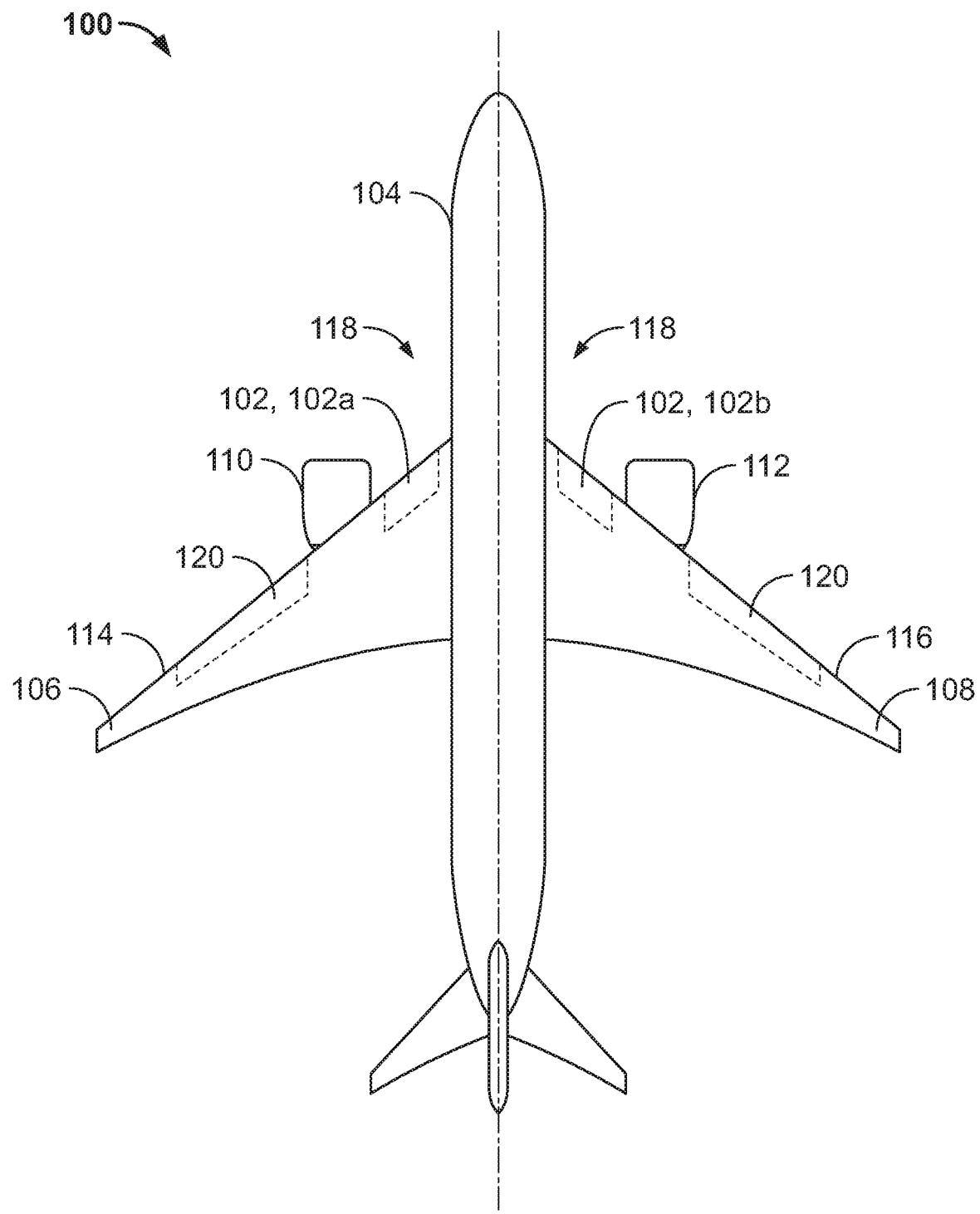
FIG. 1 illustrates an example aircraft in which an example Krueger flap may be implemented in accordance with the teachings of this disclosure.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

DETAILED DESCRIPTION

Some aircraft employ high-lift systems to enhance takeoff performance and/or efficiency. For example, leading edge devices such as, flaps (e.g., Krueger flaps), slats, airfoils having integrated drooped leading edges, etc., are components of high-lift systems. High-lift systems with low drag characteristics are particularly desirable because a lift-to-drag ratio (L/D) is a major determinant of airplane performance. For instance, an increase in L/D results in larger airplane payload, longer range and/or a shorter length runway. For example, for a large twin engine commercial airplane, an increase of 1 percent (%) in L/D during takeoff is equivalent to a 2800 pounds (lbs) increase in payload or a 150 nm increase in range. Additionally, higher L/D results in lower takeoff thrust requirements, with direct implications to airplane weight, fuel consumption and/or reduced emissions.

While exposing a Krueger flap of a high-lift system to an airflow can result in improved aerodynamics and/or handling of the aircraft at lower speeds (e.g., aircraft speeds of Mach 0.4 or less) as described above, the high-lift system can have an undesirable impact on the aerodynamics and/or handling of the aircraft at higher speeds such as, for example, a cruising speed of the aircraft. To avoid such undesirable effects, conventional high-lift systems are movable between a stowed position located at an underside of an airfoil to which a Krueger flap is coupled, and a deployed position in which at least a portion of the Krueger flap is located forward of a leading edge of the airfoil. When the high-lift systems are positioned in a stowed position, the Krueger flap is hidden, retracted, and/or housed within the airfoil to which the high-lift system is coupled. Thus, the Krueger flaps of high-lift systems can be placed into the stowed position during flight operations in which exposure of the Krueger flap to an airflow may have an undesirable impact on the aerodynamics and/or handling of the aircraft (e.g., during a cruise operation of the aircraft). This particular advantage provided by Krueger flaps is not capable of being implemented via alternative lift enhancement devices (e.g., slats, airfoils having integrated drooped leading edges, etc.), as the leading and/or forward edges of such alternative lift enhancement devices are not capable of being moved to a position in which a contour variation formed proximate the leading and/or forward edges of such alternative lift enhancement devices is not exposed to an airflow during a flight of the aircraft.

However, modification of Krueger flaps to achieve a high L/D ratio rely on optimization of the high-lift configuration. However, such optimization of the L/D ratio is limited to the geometrical constraints of the aircraft wing. For example, the geometric profile of the Krueger flaps is limited to the airfoil constraints to enable the Krueger flap to move to the stowed position within the airfoil during non-use (e.g., cruise). Thus, a size of the aircraft wing provides limits to an upper bound of a L/D ratio, which poses a limitation to airplane performance.

Additionally, airflow patterns of current Krueger flaps can be undesirable with respect to noise generation (e.g., airframe noise). Noise reduction in airport environments has become an area of high priority in the aerospace transport industry. Significant reduction in engine noise has been achieved in recent years with the advent of high bypass ratio engines. Consequently, other noise sources have become more critical, with greater focus now being placed on airframe noise reduction. A major component of airframe noise is the high-lift system. In particular, gapped leading edge devices produce high noise levels because of flow re-circulation caused by a flap (e.g., a Krueger flap) of the high-lift system.

Example high-lift systems for aircraft and related methods disclosed herein improve takeoff performance and reduce noise associated with high-lift systems. For example, high-lift systems disclosed herein reduce drag to increase aerodynamic performance of an aircraft during takeoff and/or reduce or eliminate airframe noise. To improve aerodynamic performance and/or reduce airframe noise, high-lift systems disclosed herein employ Krueger flaps. Exposing a Krueger flap of a high-lift system disclosed herein to the airflow advantageously provides for improved aerodynamics and/or handling of the aircraft. The Krueger flap is extended from under the wing during takeoff, approach and landing to expose the Krueger flap to airflow. During cruise a Krueger flap of a high-lift system is stowed in a compact form within a leading edge of a wing.

To improve aerodynamic performance and reduce noise during high-lift events (e.g., take-off), high-lift systems disclosed herein employ Krueger flaps having a teardrop profile (e.g., a teardrop cross-sectional shape). The teardrop profile of the Krueger flaps disclosed herein results in improved aerodynamic performance over a range of angles of attack and provides streamlined flow in a gap between the Krueger flap and the wing, which results in milder wake flow. For example, example high-lift systems disclosed herein provide a higher L/D ratio and lower noise relative to conventional Krueger flaps by reducing or eliminating flow recirculation that occurs with current leading edge devices and attenuating wake intensity, with favorable effects of reducing total airplane drag and lower noise. For example, a contour variation of the teardrop profile advantageously provides for an increased lift to drag (L/D) ratio associated with an airfoil of an aircraft when an example Krueger flap disclosed herein is in a deployed position. In some examples, a reduction in drag attributable to the teardrop profile can advantageously provide a reduction in noise associated with the Krueger flap and/or the airfoil to which the Krueger flap is coupled.

Providing a Krueger flap with a teardrop profile increases a dimensional envelope (e.g., a surface area, a volume, etc.) of the Krueger flap. To allow example Krueger flaps disclosed herein to store within an airfoil, Krueger flaps disclosed herein employ a multi-part flap. For example, the Krueger flap disclosed herein include a first portion movably coupled to a second portion via an actuation system. In some examples, actuation systems disclosed herein include at least one of a linear actuator or a rotary actuator. In some examples, the actuation system includes a transmission (e.g., a gear train, a chain, etc.) and/or a track to enable the first portion to move relative to the second portion. In some examples, the first portion is pivotally coupled to the second portion to enable rotation of the first portion relative to the second portion. In operation, the actuation system moves the first portion to an extended position relative to the second portion to define the teardrop profile when the Krueger flap is to be positioned in a deployed position. The actuation system moves the first portion to a retracted position relative to the second portion when the Krueger flap is to be positioned in a stowed position. In the retracted position, the Krueger flap has a smaller dimensional envelope (e.g., a smaller overall length) compared to the dimensional envelope of the Krueger flap when the Krueger flap is in the extended position. In this manner, the Krueger flap accommodates the dimensional restrictions of the airfoil when the Krueger flap is in the stowed position, while improving aerodynamic characteristics and reducing noise when the Krueger flap is in the deployed position. Example teardrop profiles of Krueger flaps disclosed herein can be implemented as a standard Krueger flap, a bullnose Krueger flap or a variable camber Krueger flap.

As used herein, the term "airfoil" refers to a spanwise segment of a wing of an aircraft. As used herein in relation to a direction of an object, the term "spanwise" describes an orientation and/or measurement in a direction along the object from a root end of the object to a tip end of the object. For example, a spanwise direction of an airfoil refers to an orientation and/or measurement in a direction along the airfoil from the root end of the airfoil to the tip end of the airfoil. Similarly, a spanwise direction of a wing refers to an orientation and/or measurement in a direction along the wing from the root end of the wing to the tip end of the wing.

FIG. 1 illustrates an example aircraft 100 having an example Krueger flap 102 in accordance with the teachings of this disclosure. The aircraft 100 includes an example fuselage 104, a first example wing 106 (e.g., a first airfoil), a second example wing 108 (e.g., a second airfoil), a first example engine 110 supported by the first wing 106, and a second example engine 112 supported by the second wing 108. The first wing 106 includes a first example Krueger flap 102a positioned inboard on the first wing 106 relative to the first engine 110 and the second wing 108 includes a second example Krueger flap 102b positioned inboard on the second wing 108 relative to the second engine 112. The Krueger flaps 102 are located along a leading edge 114 of the first wing 106 and a leading edge 116 of the second wing 108. While the aircraft 100 of FIG. 1 is illustrated as having a total of two Krueger flaps (the Krueger flaps 102a-b), the aircraft 100 of FIG. 1 may in other examples include additional (e.g., four, six, eight, ten, twelve, etc.) or fewer (e.g., two) Krueger flaps. In some examples, the location(s), size(s), and/or shape(s) of respective ones of the Krueger flaps 102a-b of the aircraft 100 may differ relative to the location(s), size(s) and/or shape(s) of the Krueger flaps 102a-b shown in FIG. 1. The Krueger flaps 102a-b of the illustrated example are shown in a stowed position 118. When the Krueger flaps 102a-b are stowed, leading portions of the Krueger flaps 102a-b are typically hidden, retracted, and/or housed within the underside of first wing 106 and the second wing 108. The first wing 106 and the second wing 108 include slats 120 along the respective leading edges 114, 116 that work together with the Krueger flaps 102a-b to alter a shape of an airfoil provided by the first wing 106 and the second wing 108 to produce additional aerodynamic lift.

Figure 2:
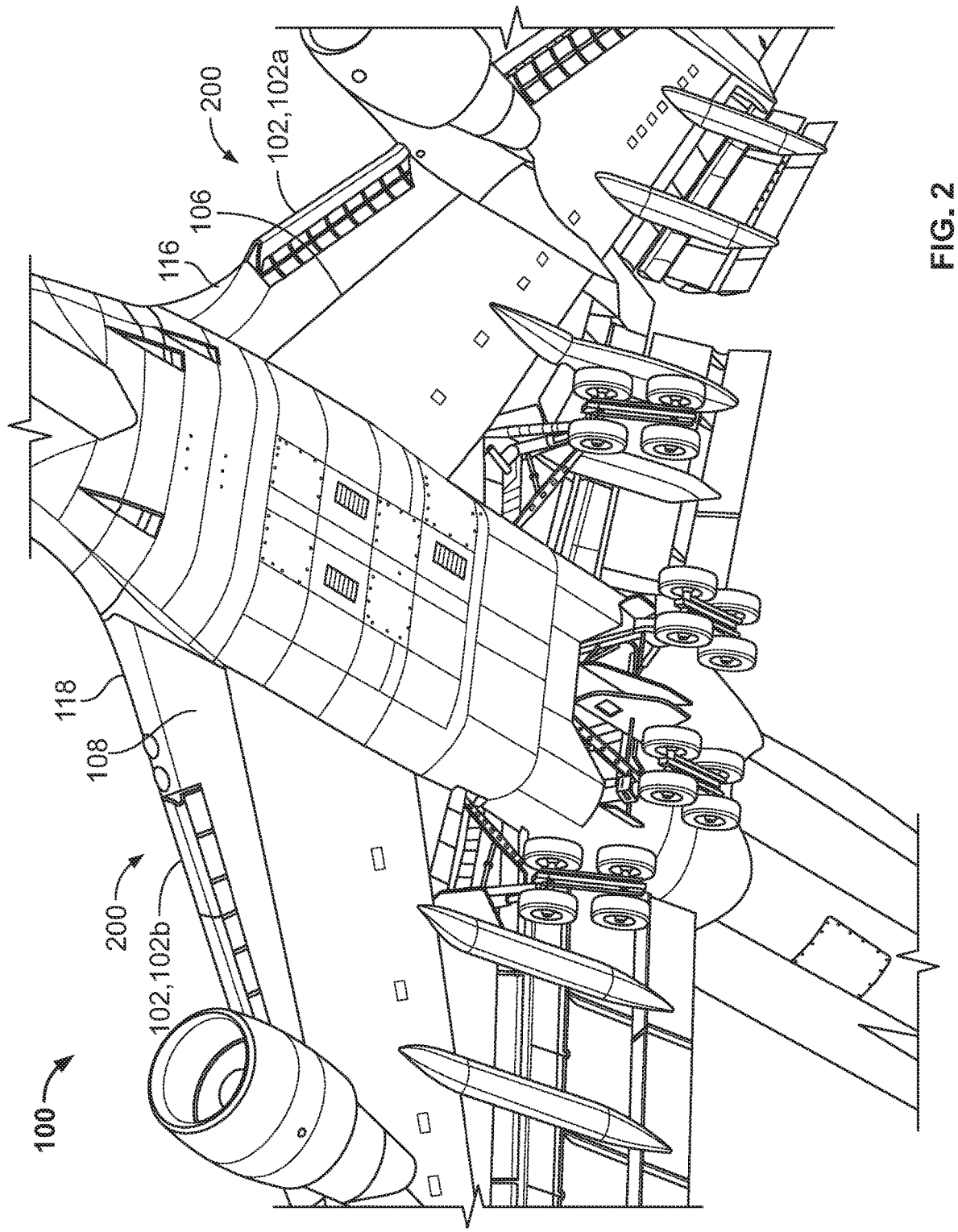
FIG. 2 is a partial, perspective view of the example aircraft of FIG. 1 showing the example Krueger flap in an example deployed position.

FIG. 2 is a perspective view of the aircraft 100 of FIG. 1 showing the Krueger flaps 102a-b in deployed positions 200. In the deployed positions 200, the Krueger flaps 102a-b extend in a spanwise direction along the first wing 106 and the second wing 108 to which the Krueger flaps 102a-b are coupled. The Krueger flaps 102a-b are located forward of the leading edge 114 of the first wing 106 and the leading edge 116 of the second wing 108 when the Krueger flaps 102a-b are fully deployed.

Figure 3A:
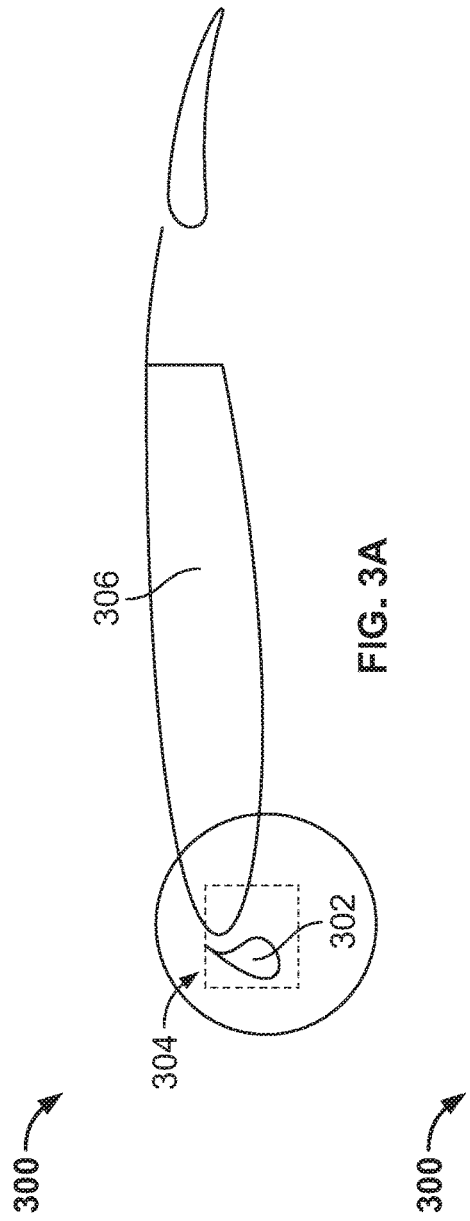
FIG. 3A is a schematic cross-sectional view of an example airfoil of FIG. 2 showing the example Krueger flap in the example deployed position.
Figure 3B:
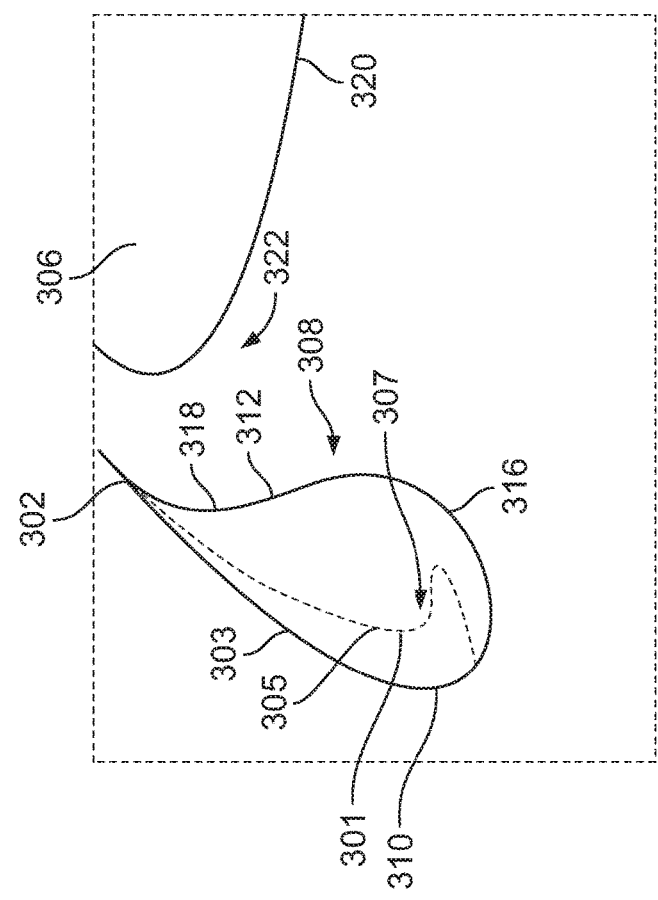
FIG. 3B is an enlarged portion of the example Krueger flap of FIG. 3A.

FIG. 3A is a schematic cross-sectional view of a high-lift system 300 (e.g., an airfoil) having an example Krueger flap 302 disclosed herein. The high-lift system 300 is shown in a deployed position 304 relative to a fixed wing 306. FIG. 3B is an enlarged view of the example Krueger flap 302 of FIG. 3A. The Krueger flap 302 can implement the example Krueger flaps 102 of FIGS. 1 and 2. In FIG. 3B, a shape of a conventional Krueger flap 301 is shown in dashed line and a shape of the example Krueger flap 302 disclosed herein is shown in solid line.

The conventional Krueger flap 301 includes a fore edge 303 and an aft edge 305. The aft edge 305 has a concave profile oriented toward the fixed wing 306 that forms a cove region 307. The cove region 307 results in a recirculation of ambient airflow as the air flows around the high-lift system 300. The conventional Krueger flap 301 produce flow recirculation on aft facing surfaces, with wakes shed from both edges 303, 305 of the conventional Krueger flap 301. A pocket of flow separation and wake elements off of the edges 303, 305 of the conventional Krueger flap 301 are major contributors to drag and noise. For example, the recirculation of airflow can often cause a significant amount of noise during takeoff and landing operations. In addition to the noise created by recirculated airflow in the cove region 307 of the conventional Krueger flap 301, airflow recirculation within the cove region 307 degrades aerodynamic performance of the conventional Krueger flap 301 by reducing an amount of lift and/or increasing an amount of drag and, thereby, reducing overall aircraft performance and efficiency.

To decrease or eliminate air recirculation and corresponding noise and performance degradation that results from the recirculation of airflow in the cove region 307, the Krueger flap 302 of the illustrated example reduces or eliminates the cove region 307. To eliminate the cove region 307, the Krueger flap 302 includes a cove-filled region 308 (e.g., an aerodynamic surface). Specifically, the Krueger flap 302 includes a fore edge 310 and an aft edge 312 when the Krueger flap 302 is in the deployed position 304. To fill or reduce the cove region 307, the Krueger flap 302 has a teardrop shaped profile. The teardrop shaped profile of the Krueger flap 302 is formed by the fore edge 310 and the aft edge 312. The fore edge 310 includes a first arcuate surface having a convex profile relative to a center (e.g., a middle) of the Krueger flap 302 (e.g., oriented toward the aft edge 312). The aft edge 312 includes a second arcuate portion 316 having a convex profile relative to the center of the Krueger flap 302 (e.g., oriented toward the fore edge 310) and a third arcuate portion 318 having a concave profile relative to the center of the Krueger flap 302 (e.g., oriented toward the fixed wing 306 or away the center or the fore edge 310 of the Krueger flap 302) that define the cove-filled region 308. For example, the cove region 307 is filled to reduce a concave portion along the aft edge 312 of the Krueger flap 302 that is common to the conventional Krueger flap 301.

The cove-filled region 308 defines an aerodynamic surface providing a smooth, gradual path for airflow to enable a substantially continuous airflow that reduces noise otherwise associated with recirculation present with conventional Krueger flaps 301. As used herein, "substantially continuous airflow" can include laminar flow, turbulent flow, or a combination thereof according to different design characteristics of a high-lift system including the Krueger flap 302 and/or corresponding flight characteristics at any given instance. The cove-filled region 308 substantially reduces or eliminates recirculation that is present within the cove region 307 of the conventional Krueger flap 301, which substantially reduces airframe noise associated with this recirculation of airflow.

For instance, the Krueger flap 302 improves airflow quality in a gap region 322 (e.g., a channel) between the Krueger flap 302 and the fixed wing 306, improving aerodynamic and/or acoustic performance. For example, the Krueger flap 302 reduces and/or eliminates flow separation and reduces or prevents formation of wake shed. As a result, airflow from the gap region 322 towards an upper side of the fixed wing 306 has greater uniformity and higher momentum compared to the conventional Krueger flap 301, leading to a more efficient interaction with viscous layers of the fixed wing 306 and the Krueger flap 302. Consequently, drag is reduced. Thus, noise reduction is realized due to an improved channel flow, and a reduced width and/or intensity of wake shed from the Krueger flap 302.

The cove-filled region 308 can be shaped and/or sized to suit specific applications and corresponding desirable aerodynamic properties. The Krueger flap 302 is shaped, sized, oriented and/or otherwise configured to increase a lift to drag (L/D) ratio associated with the Krueger flap 302 and/or the high-lift system 300 when the Krueger flap 302 is in the deployed position 304. For example, when deployed from an aircraft (e.g., the aircraft 100 of FIG. 1), the contour variation (e.g., the teardrop shaped profile) of the Krueger flap 302 can provide an increased lift to drag (L/D) ratio for the Krueger flap 302 and/or the high-lift system 300 relative to a lift to drag (L/D) ratio associated with a deployed conventional Krueger flap 301 (e.g., a Krueger flap lacking the above-described contour variation forming the teardrop shaped profile). In some examples, the Krueger flap 302 can be configured as a conventional Krueger, a bullnose Krueger, and/or a variable camber Krueger (VCK).

The Krueger flap 302 is pivotally coupled to and/or deployable from the fixed wing 306. When in a stowed position, the Krueger flap 302 is located at and/or on an underside and/or bottom surface 320 of the fixed wing 306. Although the cove-filled region 308 improves aerodynamic performance, the cove-filled region 308 has a substantially larger dimensional envelope compared to the conventional Krueger flap 301. Thus, due to the limited space in the fixed wing 306, the dimensional envelope of the cove-filled region 308 is constrained to a dimensional envelope of a storage area of the fixed wing 306 when the Krueger flap 302 is in the stowed position.

Figure 4:
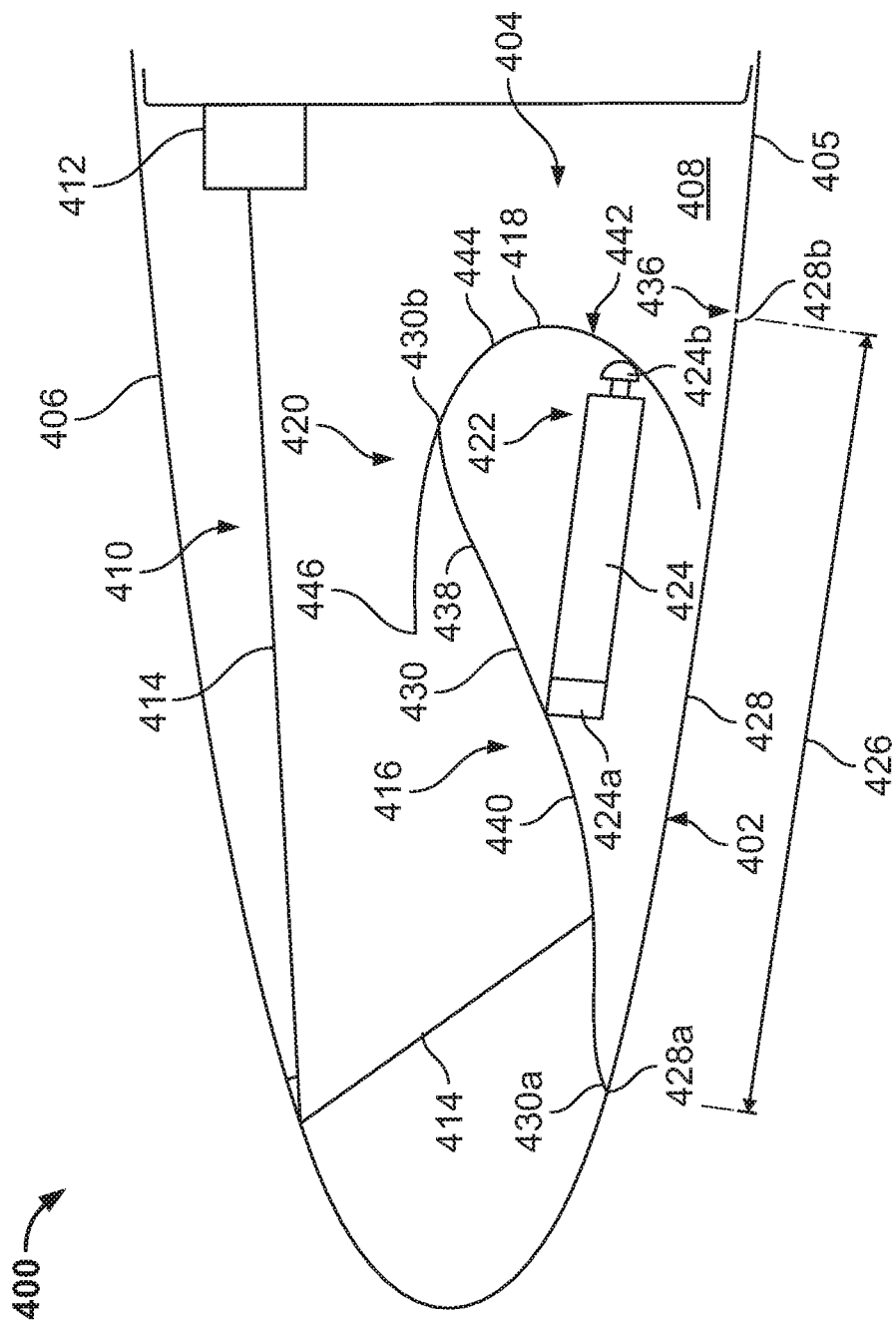
FIG. 4 is a schematic side view of an example high-lift system having an example Krueger flap disclosed herein that can implement the example aircraft of FIG. 1. The example Krueger flap of FIG. 4 is shown in an example stowed position.

FIG. 4 is a schematic cross-sectional view of an example high-lift system 400 (e.g., airfoil) having an example Krueger flap 402 disclosed herein. The example high-lift system 400 of FIG. 4 can implement the example aircraft 100 of FIGS. 1 and 2. The Krueger flap 402 is in a stowed position 404 relative to a fixed wing 406 of the high-lift system 400. In the stowed position 404, the Krueger flap 402 is located at and/or on an underside and/or bottom surface 405 of the fixed wing 406. For example, at least a portion of the Krueger flap 402 is positioned in a cavity 408 of the fixed wing 406 when the Krueger flap 402 is in the stowed position 404.

The Krueger flap 402 is movably coupled to the fixed wing 406. To move the Krueger flap 402 relative to the fixed wing 406, the high-lift system 400 includes a first actuation system 410. The first actuation system 410 is supported by the fixed wing 406 and moves the Krueger flap 402 relative to the fixed wing 406 between the stowed position 404 and a deployed position (e.g., a deployed position 500 of FIG. 5). The first actuation system 410 includes a drive 412 (e.g., an actuator, a motor, etc.) and one or more linkages 414 pivotally coupled to move the Krueger flap 402 between the stowed position 404 and a deployed position.

The Krueger flap 402 is a multi-structure component. For example, the Krueger flap 402 includes a first flap portion 416 and a second flap portion 418. The first flap portion 416 is movably (e.g., pivotally) coupled to the fixed wing 406 via the first actuation system 410 to move the Krueger flap 402 between the deployed position and the stowed position 404. The second flap portion 418 is movably (e.g., slidably) coupled to the first flap portion 416 between a first or retracted position 420 (e.g., a fully retracted position) shown in FIG. 4 and a second or extended position (e.g., a fully extended position). To move the second flap portion 418 relative to the first flap portion 416, the Krueger flap 402 includes a second actuation system 422. The second actuation system 422 includes an actuator 424 (e.g., a linear actuator) to move (e.g., slidably move) the second flap portion 418 relative to the first flap portion 416. The actuator 424 includes a first end 424a (e.g., a housing or cylinder) coupled or anchored to the first flap portion 416 and a second end 424b (e.g., a piston) coupled or anchored to the second flap portion 418. In some examples, the second flap portion 418 can move relative to the first flap portion 416 via a track or guide. In some examples, the second flap portion 418 is telescopically coupled relative to the first flap portion 416. In the retracted position 420, at least a portion of the first flap portion 416 overlaps at least a portion of the second flap portion 418. In the retracted position 420, the Krueger flap 402 has a first length 426.

The first flap portion 416 of the Krueger flap 402 defines a fore surface or fore edge 428 and aft surface or aft edge 430 of the Krueger flap 402. Additionally, the fore edge 428 aligns with and/or defines the bottom surface 405 of the fixed wing 406 when the Krueger flap 402 is in the stored position 404. For example, the fore edge 428 of the first flap portion 416 is substantially flush with the bottom surface 405 of the fixed wing 406 when the Krueger flap 402 is in the stowed position 404. As used herein, the term "substantially flush" means that the fore edge 428 (e.g., an outer surface) of the Krueger flap 402 is even with the bottom surface 405 such that the bottom surface 405 of the fixed wing 406 and the fore edge 428 of the Krueger flap 402 define a continuous smooth surface or mold line of the fixed wing 406. In some examples, a seal can be provided to seal a gap 436 between the fore edge 428 and the bottom surface 405 of the fixed wing 406 when the Krueger flap 402 is in the stowed position 404. In some examples, the fore edge 428 is positioned in the cavity 408 of the fixed wing 406 and a door (e.g., a retractable door) aligns with and/or defines the bottom surface 405 of the fixed wing 406.

The fore edge 428 of the first flap portion 416 has an arcuate profile between a first end 428a and a second end 428b that is complementary to a profile of the bottom surface 405 of the fixed wing 406. The aft edge 430 of the first flap portion 416 has an arcuate profile between a first end 430a and a second end 430b that includes a convex shape or profile 438 relative to a center of the Krueger flap 402 (e.g., oriented toward the fore edge 428) and a concave shape or profile 440 relative to the center of the Krueger flap 302 (e.g., oriented toward the fixed wing 406 or away from the fore edge 428). The fore edge 428 and the aft edge 430 are coupled at respective ones of the first ends 428a, 430a. The second flap portion 418 defines a nose 442 of the Krueger flap 402 and has an arcuate surface having a convex shape or profile relative to center of the Krueger flap 402. To provide the first length 426 in the retracted position 420, an end 446 of the second flap portion 418 overlaps or is positioned away from the respective ends 428b and/or 430b of the fore edge 428 and the aft edge 430. For example, (e.g., a cavity) defined by the second flap portion 418 receives the second end 430b of the aft edge 430 when the Krueger flap 402 is in the retracted position 420.

Figure 5:
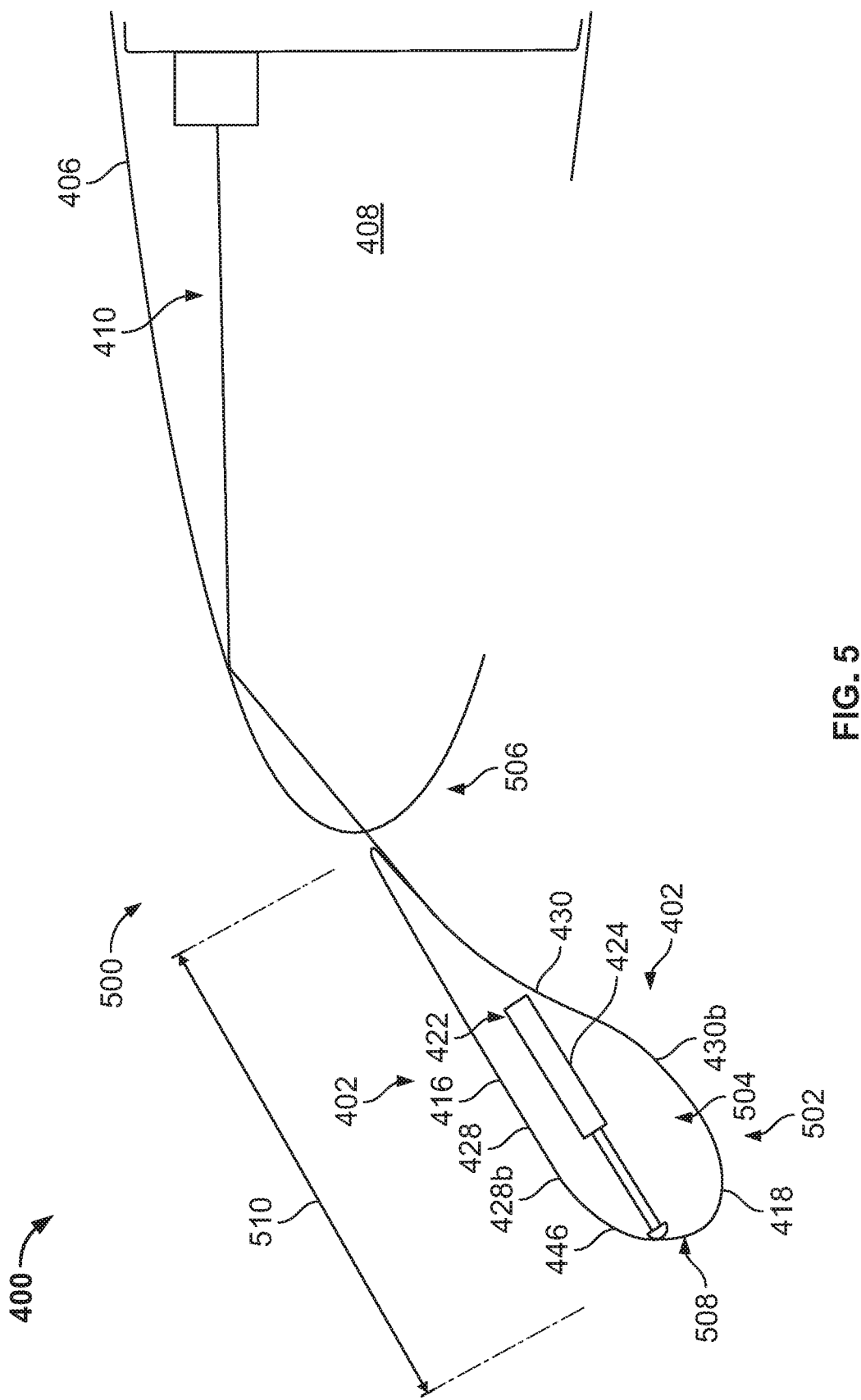
FIG. 5 is a schematic side view of the example high-lift system of FIG. 4 showing the Krueger flap in an example deployed position.

FIG. 5 is a cross-sectional view of the high-lift system 400 of FIG. 4 shown in the deployed position 500. Additionally, the Krueger flap 402 is shown in an example extended position 502. In the extended position 502, the first flap portion 416 and the second flap portion 418 fill a cove-region 504 of the Krueger flap 402 to reduce or eliminate airflow recirculation within a channel or gap 506 between the Krueger flap 402 and the fixed wing 406 when the high-lift system 400 is in the deployed position 500. In other words, the Krueger flap 402 forms an aerodynamic surface 508 having a teardrop shaped profile (e.g., similar to the teardrop profile of FIGS. 3A and 3B) that increases a lift to drag ratio associated with the Krueger flap 402. The aerodynamic surface 508 of the Krueger flap 402 is exposed to airflow when the Krueger flap 402 is in the deployed position 500.

To move the Krueger flap 402 to the deployed position 500, the first actuation system 410 pivots the Krueger flap 402 relative to the fixed wing 406. Additionally, the Krueger flap 402 moves to the extended position 502 via the second actuation system 422 to define the aerodynamic surface 508 of the Krueger flap 402 in response to the Krueger flap 402 moving to the deployed position 500. Specifically, the second flap portion 418 slides relative to the first flap portion 416 when the second flap portion 418 moves relative to the first flap portion 416 between the retracted position 420 (FIG. 4) and the extended position 502. Specifically, in the extended position 502, the end 446 of the second flap portion 418 is positioned to engage (e.g., matably align or abut) the second end 428a of the fore edge 428 and the second end 430b of the aft edge 430. In other words, the end 446 of the second flap portion 418 couples to the second ends 428a, 430b of the respective fore edge 428 and the aft edge 430. As a result, the end 446 of the second flap portion 418 does not overlap with (e.g., the second end 428b) of the fore edge 428 and (e.g., the second end 430b) of the aft edge 430 when the second flap portion 418 is in the extended position 502. In this manner, the first flap portion 416 and the second flap portion 418 provide a smooth or continuous surface between the fore edge 428 and the aft edge 430 of the Krueger flap 402. In the extended position, the Krueger flap 402 has a second length 510 that is greater than the first length 426.

Referring to FIGS. 4 and 5, in operation, the Krueger flap 402 moves to the retracted position 420 when the high-lift system 400 moves to the stowed position 404 (e.g., during cruise). To move the Krueger flap 402 to the retracted position 404, the actuator 424 is retracted such that the second flap portion 418 is moved to at least partially overlap the first flap portion 416, thereby reducing a length of the Krueger flap 402 (e.g., from the second length 510 to the first length 426) to enable Krueger flap 402 to fit within the cavity 408 of the fixed wing 406. In the retracted position 420, the aerodynamic surface 508 of the Krueger flap 402 is hidden from the airflow when the Krueger flap 402 is in the stowed position 404. During landing or takeoff, the Krueger flap 402 moves to the deployed position 500. As the Krueger flap 402 moves to the deployed position 500 (e.g., at an intermediate position between the deployed position 500 and the stowed position 404), the second actuation system 422 activates to move the second flap portion 418 relative to the first flap portion 416 to the extended position 502 (e.g., a fully extended position). In the extended position 502, the first flap portion 416 (e.g., the aft edge 430) and the second flap portion 418 define the aerodynamic surface 444 (e.g., a teardrop shaped cross-sectional profile). Thus, the first flap portion 416 and the second flap portion 418 do not form a teardrop shaped aerodynamic surface when the second flap portion 418 is in the retracted position 420. The first flap portion 416 and the second flap portion 418 form the aerodynamic surface of the Krueger flap 402 having a teardrop shape profile in response to the Krueger flap 402 moving to the deployed position 500 and the second flap portion 418 moving to the extended position 502 relative to the first flap portion 416.

FIGS. 6-13 illustrate other example high-lift systems 600, 800, 1000, 1200 disclosed herein that can implement a high-lift system of the aircraft 100 of FIGS. 1 and 2. Those components of the example high-lift systems 600-1200 of FIGS. 6-13 that are substantially similar or identical to the components of the high-lift system 400 described above and that have functions substantially similar or identical to the functions of those components will not be described in detail again below. Instead, the interested reader is referred to the above corresponding descriptions. To facilitate this process, identical reference numbers will be used for like structures. For example, the high-lift systems 600-1200 each include a Krueger flap 602-1202 movable relative to a fixed wing 406 via a first actuation system 410.

Figure 6:
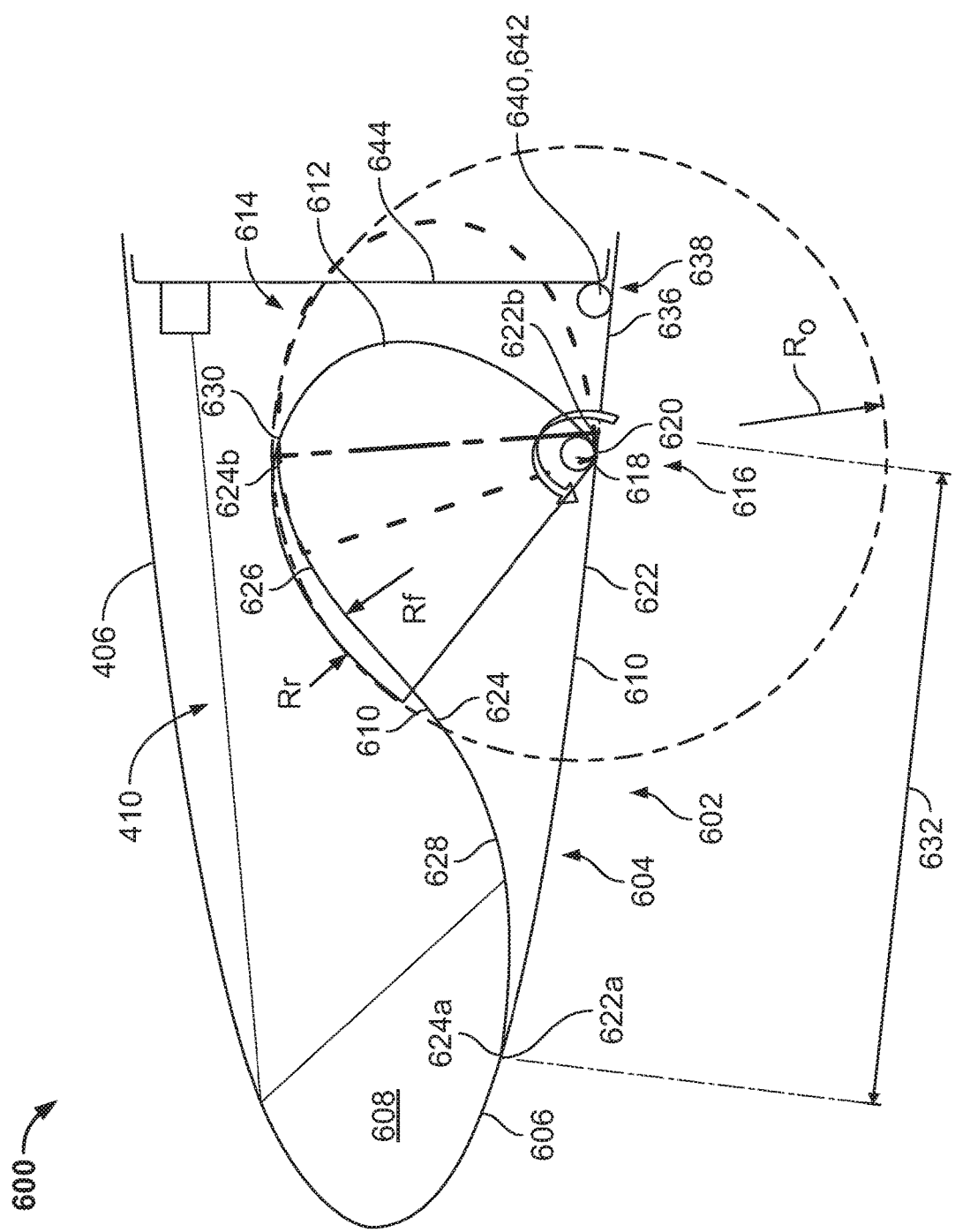
FIG. 6 is a schematic side view of another example high-lift system having another example Krueger flap disclosed herein that can implement the example aircraft of FIG. 1. The example Krueger flap of FIG. 6 is shown in an example stowed position.

FIG. 6 is a schematic cross-sectional view of another example high-lift system 600 having an example Krueger flap 602 disclosed herein. The example high-lift system 600 of FIG. 6 can implement the example aircraft 100 of FIGS. 1 and 2. The Krueger flap 602 is in a stowed position 604 relative to a fixed wing 406 of the high-lift system 600. In the stowed position 604, the Krueger flap 602 is located at and/or on an underside and/or bottom surface 606 of the fixed wing 406. For example, at least a portion of the Krueger flap 602 is positioned in a cavity 608 of the fixed wing 406 when the Krueger flap 602 is in the stowed position 604.

The Krueger flap 602 is a multi-piece flap. For example, the Krueger flap 602 includes a first flap portion 610 (e.g., a fixed element) and a second flap portion 612 (e.g., a rotating element). The first flap portion 610 is movably (e.g., pivotally) coupled to the fixed wing 406 via the first actuation system 410 to move the Krueger flap 602 between the stowed position 604 and a deployed position. The second flap portion 612 is movably (e.g., rotatably) coupled to the first flap portion 610 between a first or retracted position 614 (e.g., a fully retracted position) shown in FIG. 6 and a second or extended position (e.g., a fully extended position). To move the second flap portion 612 relative to the first flap portion 610, the Krueger flap 602 includes a second actuation system 616. The second actuation system 616 includes an actuator 618 (e.g., a rotary actuator or motor) to move (e.g., rotate) the second flap portion 612 relative to the first flap portion 610.

The actuator 618 is coupled (e.g., fixed or connected) to the first flap portion 610 and rotates the second flap portion 612 relative to the first flap portion 610 about an axis of rotation 620. The first flap portion 610 includes a fore surface or fore edge 622 having a first end 622a and a second end 622b, and an aft surface or aft edge 624 having a first end 624a and second end 624b. The fore edge 622 is substantially planar (e.g., has a small amount of curvature). The aft edge 624 includes a first arcuate portion 626 having a convex shape relative to a center of the Krueger flap 602 (e.g., oriented in a direction away from the fixed wing 406 or toward the fore edge 622) and a second arcuate portion 628 having a concave shape relative to the center of the Krueger flap 602 (e.g., oriented in a direction toward the fixed wing 406 or in a direction away from the foe edge 622). The second flap portion 612 defines an arcuate portion 630 having a convex shape or profile relative to the center of the Krueger flap 602. The first ends 622a, 624a of the respective fore and aft edges 622, 624 are coupled or joined. In the retracted position 614, at least a portion of the second flap portion 612 overlaps at least a portion of the first flap portion 610 (e.g., the aft edge 624) to provide a first length 632 of the Krueger flap 602. For example, at least a portion of the first flap portion 610 is received by the second flap portion 612. In other words, in the retracted position 614, at least a portion (e.g., the second end 624b) of the first flap portion 610 (e.g., the aft edge 624) is partially enclosed within the second flap portion 612. The actuator 618 is positioned or fixed adjacent the second end 622b of the fore edge 622.

Additionally, the fore edge 622 of the first flap portion 610 defines a portion of the bottom surface 606 of the fixed wing 406 when the Krueger flap 602 is in the stowed position 604. For example, the fore edge 622 of the first flap portion 610 is substantially flush with the bottom surface 606 of the fixed wing 406 when the Krueger flap 602 is in the stowed position 604. The high-lift system 600 of the illustrated example includes a panel 636 (e.g., a door) defining at least a portion of the bottom surface 606 of the fixed wing 406. Specifically, the panel 636 is movable between a closed position 638 and an open position (e.g., an open position 712 of FIG. 7). To move the panel 636 between the closed position 638 and the open position, the high-lift system 600 includes a third actuation system 640 (e.g., a rotary actuator). The third actuation system 640 includes an actuator 642 (e.g., a rotary actuator) coupled (e.g., fixed) to a wing spar 644 of the fixed wing 406. The panel 636 is movable to the closed position 638 when the Krueger flap 602 is in the stowed position 604. In the closed position 638, the panel 636 aligns with the fore edge 622 of the first flap portion 610. The fixed wing 406, the fore edge 622, and the panel 636 form the bottom surface 606 of the fixed wing 406 having a smooth and continuous wing mold line.

Figure 7:
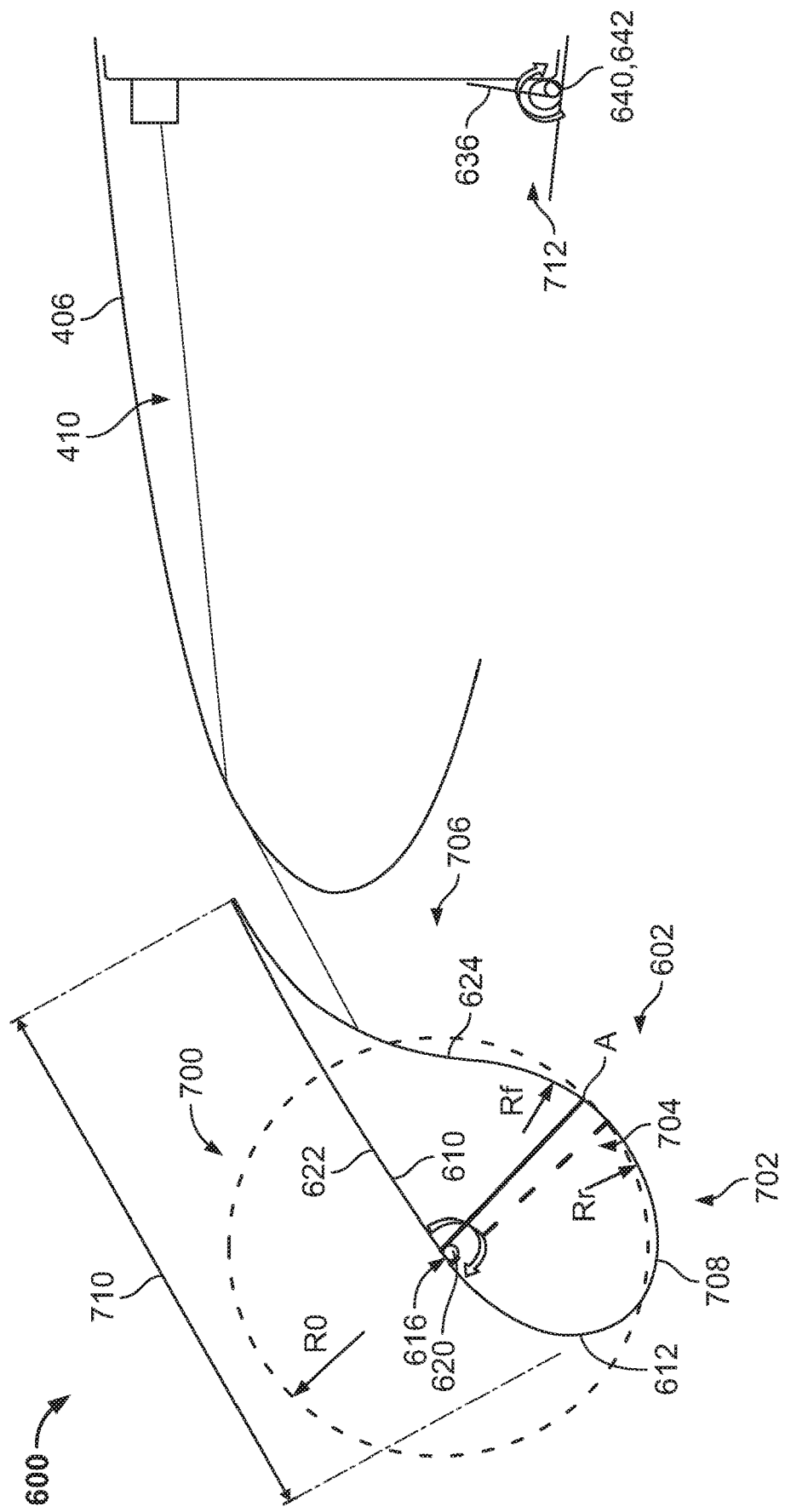
FIG. 7 is a schematic side view of the example high-lift system of FIG. 6 showing the Krueger flap in an example deployed position.

FIG. 7 shows the high-lift system 600 in a deployed position 700 and the Krueger flap 602 in an extended position 702. In the extended position 702, the first flap portion 610 and the second flap portion 612 fill a cove-region 704 of the Krueger flap 602 to reduce or eliminate flow recirculation within a channel or gap 706 between the Krueger flap 602 and the fixed wing 406. In other words, the Krueger flap 602 forms an aerodynamic surface 708 having a teardrop shaped profile (e.g., similar to the teardrop shaped profile of FIGS. 3A and 3B) that increases a lift to drag ratio associated with the Krueger flap 602. Specifically, the aerodynamic surface 708 is formed by the surfaces of the first flap portion 610 and the second flap portion 612 when the Krueger flap 602 is in the extended position 702. For example, the second flap portion 612 and the first flap portion 610 form a continuous, smooth aerodynamic surface 708 of the Krueger flap 602. The aerodynamic surface 708 of the Krueger flap 602 is exposed to an airflow when the Krueger flap 602 is in the deployed position 700.

The first flap portion 610 has a first radius ($R_f$) and the second flap portion 612 has a second radius ($R_r$) adjacent a point A between the first and second flap portions 610, 612. The first radius $R_f$ and the second radius $R_r$ are configured to allow rotation of the second flap portion 612 relative to the first flap portion 610 without interference from the first flap portion 610. For example, if a radius of rotation at point A is $R_0$, then $R_f < R_0 < R_r$. In the extended position 702, the Krueger flap 602 has a second length 710 that is greater than the first length 632.

Referring to FIGS. 6 and 7, to deploy the Krueger flap 602, the third actuation system 640 moves the panel 636 to the open position 712 (e.g., in a clockwise rotation in the orientation of FIGS. 6 and 7). The first actuation system 410 activates to move the Krueger flap 602 relative to the fixed wing 406 between the stowed position 604 and the deployed position 700. During movement of the Krueger flap 602 toward the deployed position 700 (or when the Krueger flap 602 is in the deployed position 700), the second actuation system 616 rotates the second flap portion 612 relative to the first flap portion 610 to the extended position 702. For example, to move the second flap portion 612 to the extended position 702, the second actuation system 616 rotates the second flap portion 612 in a first rotational direction (e.g., a clockwise direction in the orientation of FIG. 7) about the axis of rotation 620.

To stow the high-lift system 600, the first actuation system 410 moves the Krueger flap 602 relative to the fixed wing 406 from the deployed position 604 to the stowed position 700. During movement of the Krueger flap 602 toward the stowed position 604 (e.g., an intermediate position between the deployed position 700 and the stowed position 604), the second actuation system 616 rotates the second flap portion 612 relative to the first flap portion 610 to the retracted position 614. For example, to move the second flap portion 612 to the retracted position 614, the second actuation system 616 rotates the second flap portion 612 in a second rotational direction (e.g., a counterclockwise direction in the orientation of FIG. 7) about the axis of rotation 620. Moving the second flap portion 612 to the retracted position 614 reduces a length of the Krueger flap 602 (e.g., a size of the aerodynamic surface 708 or the teardrop shape) to enable the Krueger flap 602 to stow within the fixed wing 406. After the Krueger flap 602 is in the stowed position 604, the third actuation system 640 moves the panel 636 to the closed position 638 such that the fore edge 622, the panel 636 and the bottom surface 606 of the fixed wing form a smooth and continuous wing mold line.

Figure 8:
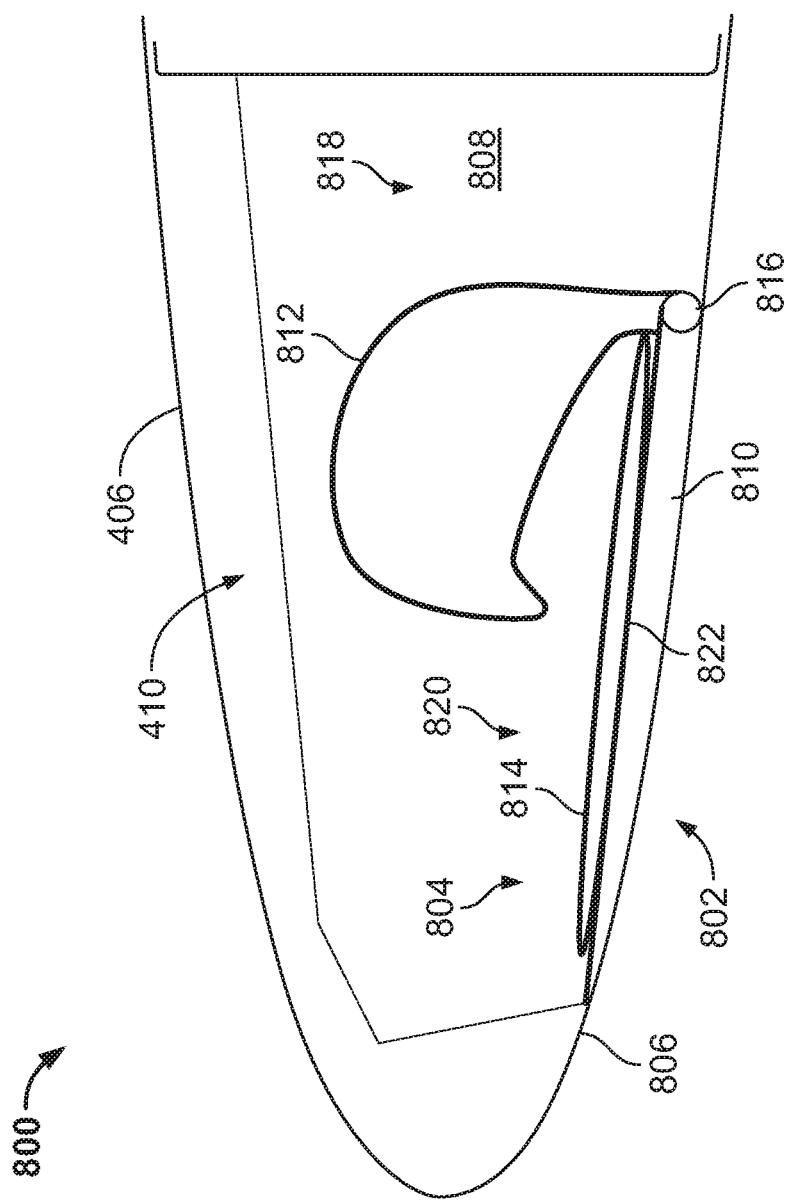
FIG. 8 is a schematic side view of another example high-lift system having another example Krueger flap disclosed herein that can implement the example aircraft of FIG. 1. The example Krueger flap of FIG. 8 is shown in an example stowed position.

FIG. 8 is a schematic cross-sectional view of another example high-lift system 800 having an example Krueger flap 802 disclosed herein. The example high-lift system 800 of FIG. 8 can implement the example aircraft 100 of FIGS. 1 and 2. The Krueger flap 802 is in a stowed position 804 relative to a fixed wing 406 of the high-lift system 800. In the stowed position 804, the Krueger flap 802 is located at and/or on an underside and/or bottom surface 806 of the fixed wing 406. For example, at least a portion of the Krueger flap 802 is positioned in a cavity 808 of the fixed wing 406 when the Krueger flap 802 is in the stowed position 804.

The Krueger flap 802 is a multi-piece flap. For example, the Krueger flap 802 includes a first flap portion 810, a second flap portion 812 (e.g., a bull nose), and a third flap portion 814. The second flap portion 812 is pivotally coupled to the first flap portion 810 about a pivot 816 defining an axis of rotation. The first actuation system 410 moves the Krueger flap 802 between the stowed position 804 and a deployed position (e.g., a deployed position 900 of FIG. 9). In some examples, the high-lift system 800 of FIG. 8 includes a second actuation system (e.g., a rotary actuator, a motor, etc.) to rotate the second flap portion 812 between a first or retracted position 818 shown in FIG. 8 and a second or extended position. In some examples, the first actuation system 410 moves the second flap portion 812 between the retracted position 818 and an extended position (e.g., the extended position 902 of FIG. 9). For example, the second flap portion 812 can be coupled to the first actuation system 410 (e.g., via a link) such that the second flap portion 812 moves to the retracted position 818 in response to the Krueger flap 802 moving to the stowed position 804 and moves the second flap portion 812 to an extended position in response to the Krueger flap 802 moving to a deployed position.

The third flap portion 814 is an inflatable bladder. Specifically, the third flap portion 814 is located on an inner surface 822 of the first flap portion 810. The high-lift system 800 includes a third actuation system (e.g., a pump) to provide pressurized fluid (e.g., air) to the third flap portion 814. In some examples, the pressurized fluid is provided via a supply source (e.g., a bleed air system of an aircraft, environmental control system of an aircraft, etc.). For example, the third flap portion 814 moves between a third or deflated position 820 (e.g., a contracted or depressurized position) and a fourth or inflated position (e.g., an expanded or pressurized position). In the stowed position 804, the third flap portion 814 is in the deflated position 820 (e.g., is depressurized) to enable the second flap portion 812 to move to the retracted position 818. In some examples, a vacuum or suction is applied to depressurize or deflate the third flap portion 814.

Figure 9:
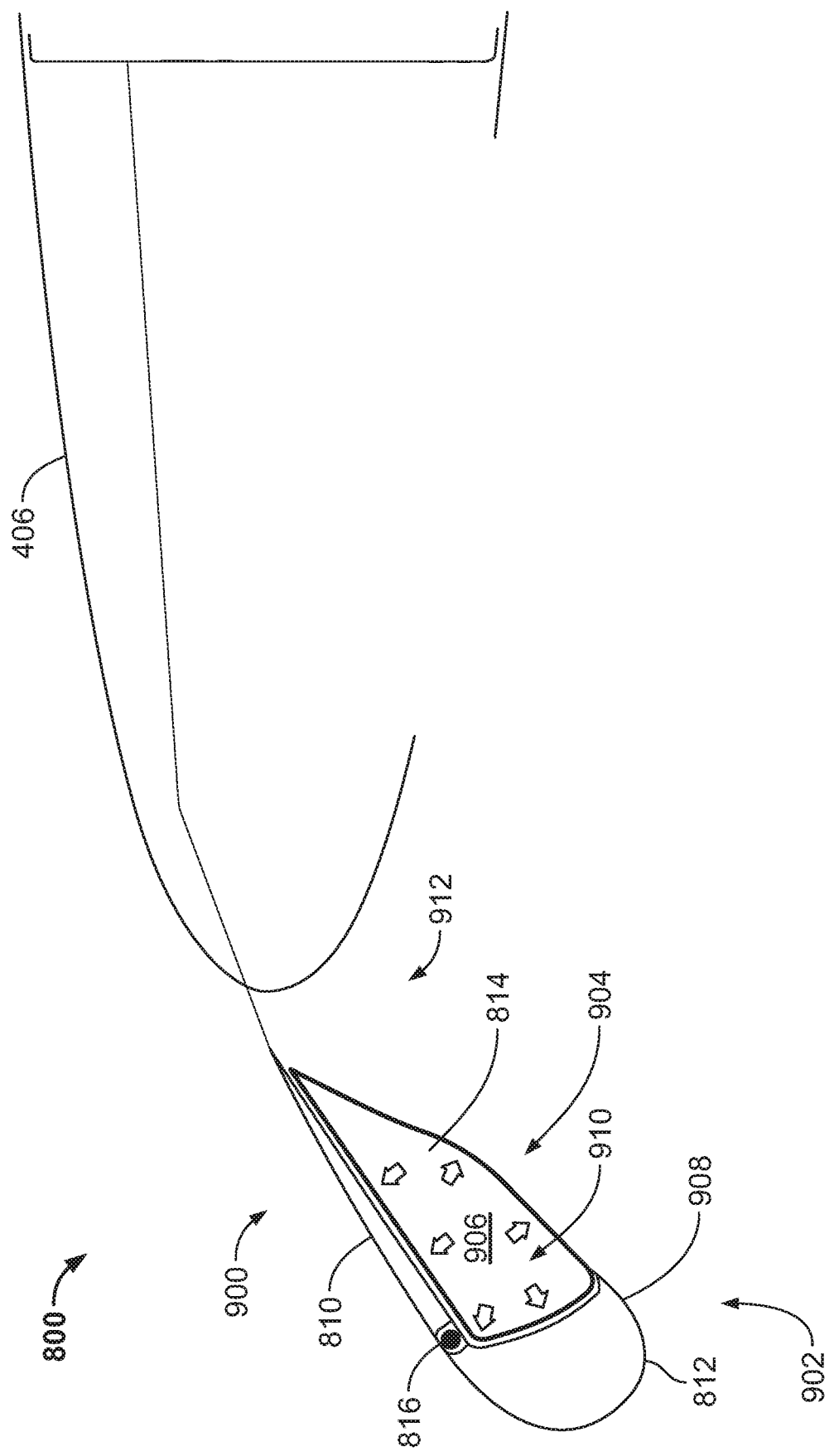
FIG. 9 is a schematic side view of the example high-lift system of FIG. 8 showing the Krueger flap in an example deployed position.

FIG. 9 is a schematic cross-sectional view of the high-lift system 800 shown in a deployed position 900. In the deployed position 900, the second flap portion 812 of the Krueger flap 802 moves to an extended position 902 and the third flap portion 814 moves to an inflated position 904. To inflate the third flap portion 814 to the inflated position 904 (e.g. a fully expanded position), pressurized fluid (e.g., air) is provided in a cavity 906 of the third flap portion 814 when the Krueger flap 802 is deployed during takeoff. In some examples, pressurized fluid is gradually supplied to the cavity 906 when the Krueger flap 802 moves to the deployed position 900 until the third flap portion 814 is in the inflated position 904. In the deployed position 900, the first flap portion 810, the second flap portion 812 and the third flap portion 814 define an aerodynamic surface 908 having a teardrop shape profile. Specifically, the third flap portion 814 fills a cove-region 910 of the Krueger flap 802 to reduce or eliminate flow recirculation within a channel or gap 912 between the Krueger flap 802 and the fixed wing 406. When the Krueger flap 802 moves to the stowed position 804 of FIG. 8, the pressurized fluid is removed (e.g., vented) from the cavity 906 of the third flap portion 814 to move the third flap panel to the deflated position 820 (e.g., deflated position) to allow the second flap portion 812 to move to the retracted position 818.

Figure 10:
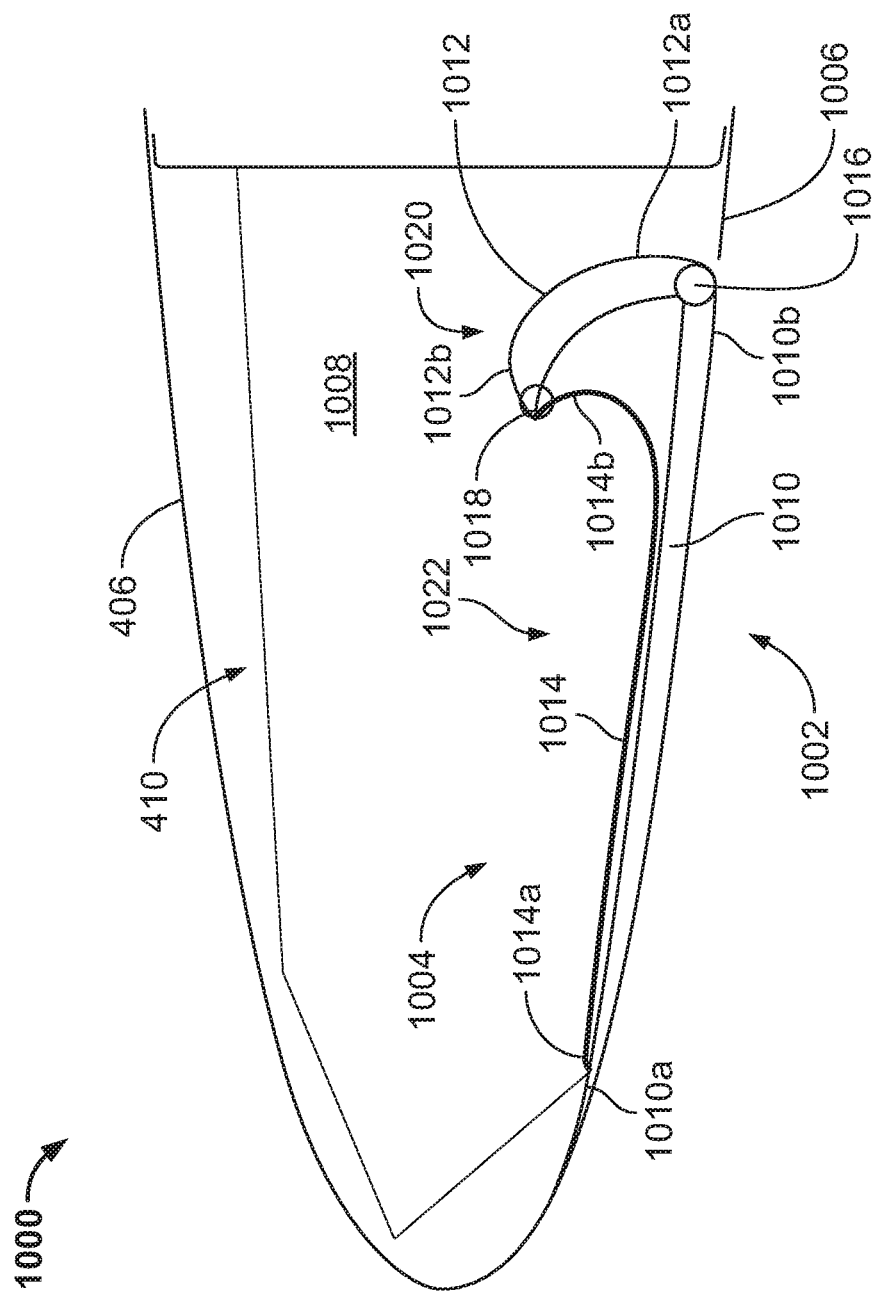
FIG. 10 is a schematic side view of another example high-lift system having another example Krueger flap disclosed herein that can implement the example aircraft of FIG. 1. The example Krueger flap of FIG. 10 is shown in an example stowed position.

FIG. 10 is a schematic cross-sectional view of another example high-lift system 1000 having an example Krueger flap 1002 disclosed herein. The example high-lift system 1000 of FIG. 10 can implement the example aircraft 100 of FIGS. 1 and 2. As shown in FIG. 10, the Krueger flap 1002 is in a stowed position 1004 relative to a fixed wing 406 of the high-lift system 1000. In the stowed position 1004, the Krueger flap 1002 is located at and/or on an underside and/or bottom surface 1006 of the fixed wing 406. For example, at least a portion of the Krueger flap 1002 is positioned in a cavity 1008 of the fixed wing 406 when the Krueger flap 1002 is in the stowed position 1004.

The Krueger flap 1002 is a multi-piece flap. For example, the Krueger flap 1002 includes a first flap portion 1010, a second flap portion 1012 (e.g., a bullnose), and a third flap portion 1014 (e.g., a cove-filler). The first flap portion 1010 has a first end 1010a coupled to the first actuation system 410 and a second end 1010b coupled to a first end 1012a of the second flap portion 1012 via a first pivot 1016 (e.g., defining a first axis of rotation). The third flap portion 1014 has a first end 1014a coupled to the first end 1010a of the first flap portion 1010 and a second end 1014b pivotally coupled to a second end 1012b of the second flap portion 1012 via a second pivot 1018 (e.g., defining a second axis of rotation).

Figure 11:
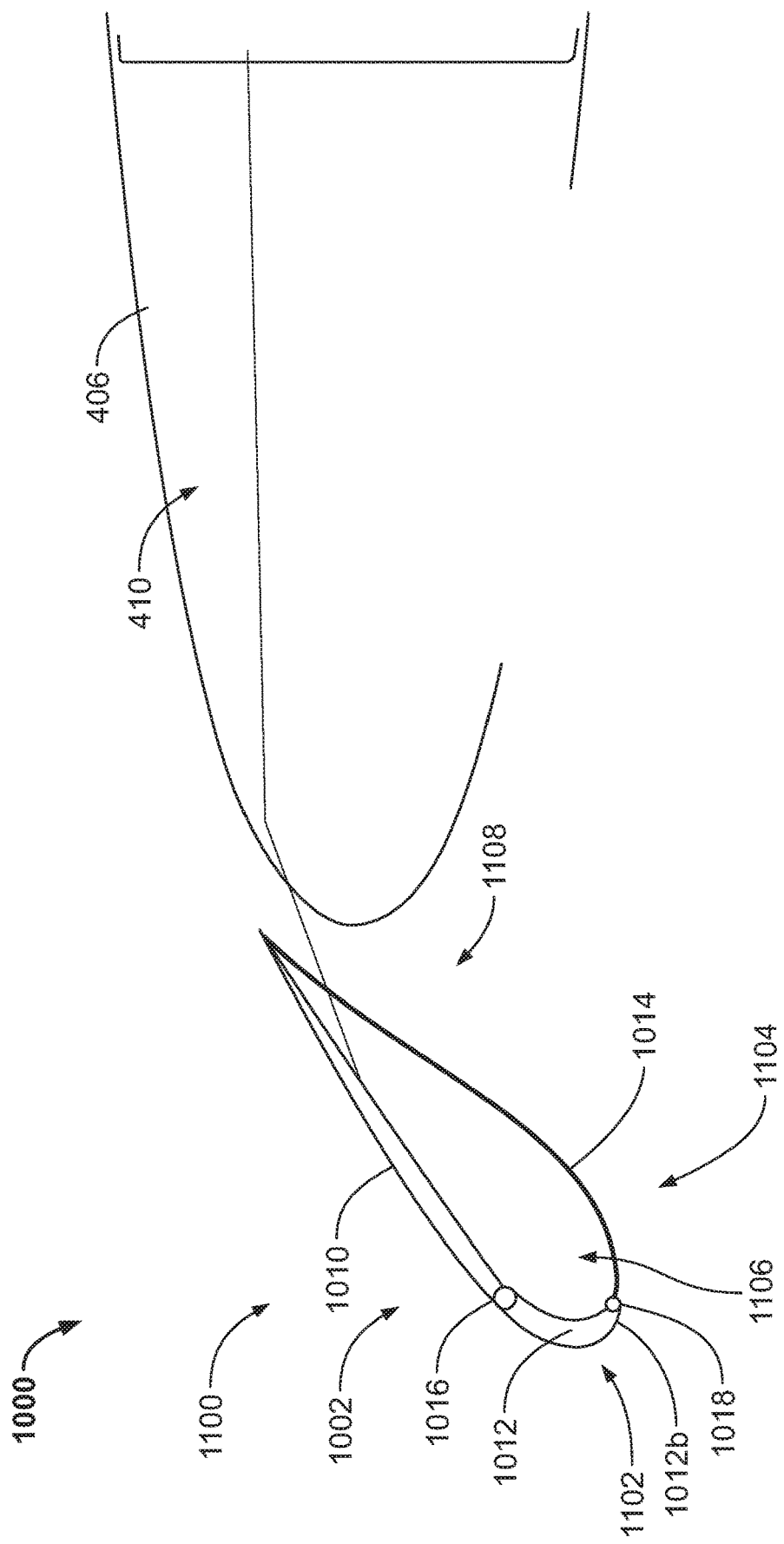
FIG. 11 is a schematic side view of the example high-lift system of FIG. 10 showing the Krueger flap in an example deployed position.

The high-lift system 1000 of FIG. 10 includes a second actuation system (not shown) to rotate the second flap portion 1012 between a first or retracted position 1020 shown in FIG. 10 and a second or extended position (e.g., an extended position 1102 shown in FIG. 11). In some examples, the second flap portion 1012 is coupled to the first actuation system 410 (e.g., via a link) that causes the second flap portion 1012 to move to the retracted position 1020 in response to the Krueger flap 1002 moving to the stowed position 1004 and the extended position in response to the Krueger flap 1002 moving to the deployed position.

The third flap portion 1014 is a flexible membrane (e.g., a diaphragm) movable between a third or collapsed position 1022 (e.g. a first stable condition) and a fourth or expanded position (e.g., a second stable position or an expanded position 1104 of FIG. 11). The third flap portion 1014 is made of a flexible, bi-stable material. The third flap portion can be made of a polymer base material such as, for example, a fiber-reinforced polymer or plastic, a carbon-reinforced polymer or plastic, a carbon-fiber reinforced polymer or plastic (CFRP), elastomer(s), and/or any other suitable material(s) or composite(s).

To move the third flap portion 1014 between the collapsed position 1022 and the expanded position, the high-lift system 1000 includes a third actuation system (e.g., a rotary actuator). The third actuation system can be a rotary actuator located at the second end 1012b of the second flap portion 1012. The third flap portion 1014 is connected to the rotary actuator located at the second end 1012b of the second flap portion 1012. When the high-lift system 1000 is in the stowed position 1004 and the second flap portion 1012 is in the retracted position 1020, the third flap portion 1014 is in the collapsed position 1022.

FIG. 11 is a schematic cross-sectional view of the high-lift system 1000 showing the high-lift system 1000 in the deployed position 1100. When the Krueger flap 1002 is in the deployed position 1100, the second flap portion 1012 is in an extended position 1102 and the third flap portion 1014 is in the expanded position 1104. In the expanded position 1104, the third flap portion 1014 fills a cove region 1106 of the Krueger flap 1002 to reduce or eliminate flow recirculation within a channel or gap 1108 between the Krueger flap 1002 and the fixed wing 406.

Referring to FIGS. 10 and 11, in operation, to deploy the Krueger flap 1002, the first actuation system 410 moves the Krueger flap 1002 to the deployed position 1100. When the Krueger flap 1002 is deployed, the second actuation system moves the second flap portion 1012 from the retracted position 1020 to the extended position 1102. Specifically, the second actuation system rotates the second flap portion 1012 about the first pivot 1016 in a first rotational direction (e.g., in a clockwise direction in the orientation of FIG. 11). In turn, the third actuation system rotates (e.g., applies a torque on) the third flap portion 1014 in the first rotational direction (e.g., a clockwise direction in the orientation of FIG. 11) to displace the third flap portion 1014 from the collapsed position 1022 to the expanded position 1104 to fill the cove region 1106. Specifically, the third flap portion 1014 snaps into the expanded position 1104 when rotated to the expanded position 1104. The third flap portion 1014 has a rigidity characteristic to maintain a shape when the third flap portion 1014 is fully expanded or deployed.

To store the Krueger flap 1002, the first actuation system 410 moves the Krueger flap 1002 to the stowed position 1004. In response to the Krueger flap 1002 moving toward the stowed position 1004, the second actuation system rotates the second flap portion 1012 about the first pivot 1016 (e.g., a rotational axis) in a second rotational direction (e.g., a counterclockwise direction in the orientation of FIGS. 10 and 11) to move the second flap portion 1012 from the expanded position 1104 to the retracted position 1020. The third actuation system rotates (e.g., applies a torque to) the third flap portion 1014 in the second rotational direction (e.g., a counterclockwise direction in the orientation of FIGS. 10 and 11) to move the third flap portion 1014 from the expanded position 1104 to the collapsed position 1022. The combined motion of rotating the second flap portion 1012 to the retracted position 1020 and the third flap portion 1014 to the collapsed position 1022 causes flexing of the third flap portion 1014 until the third flap portion 1014 moves (e.g., snaps back) to the collapsed position 1022. In the collapsed position 1022, the third flap portion 1014 maintains a substantially rigid profile.

Figure 12:
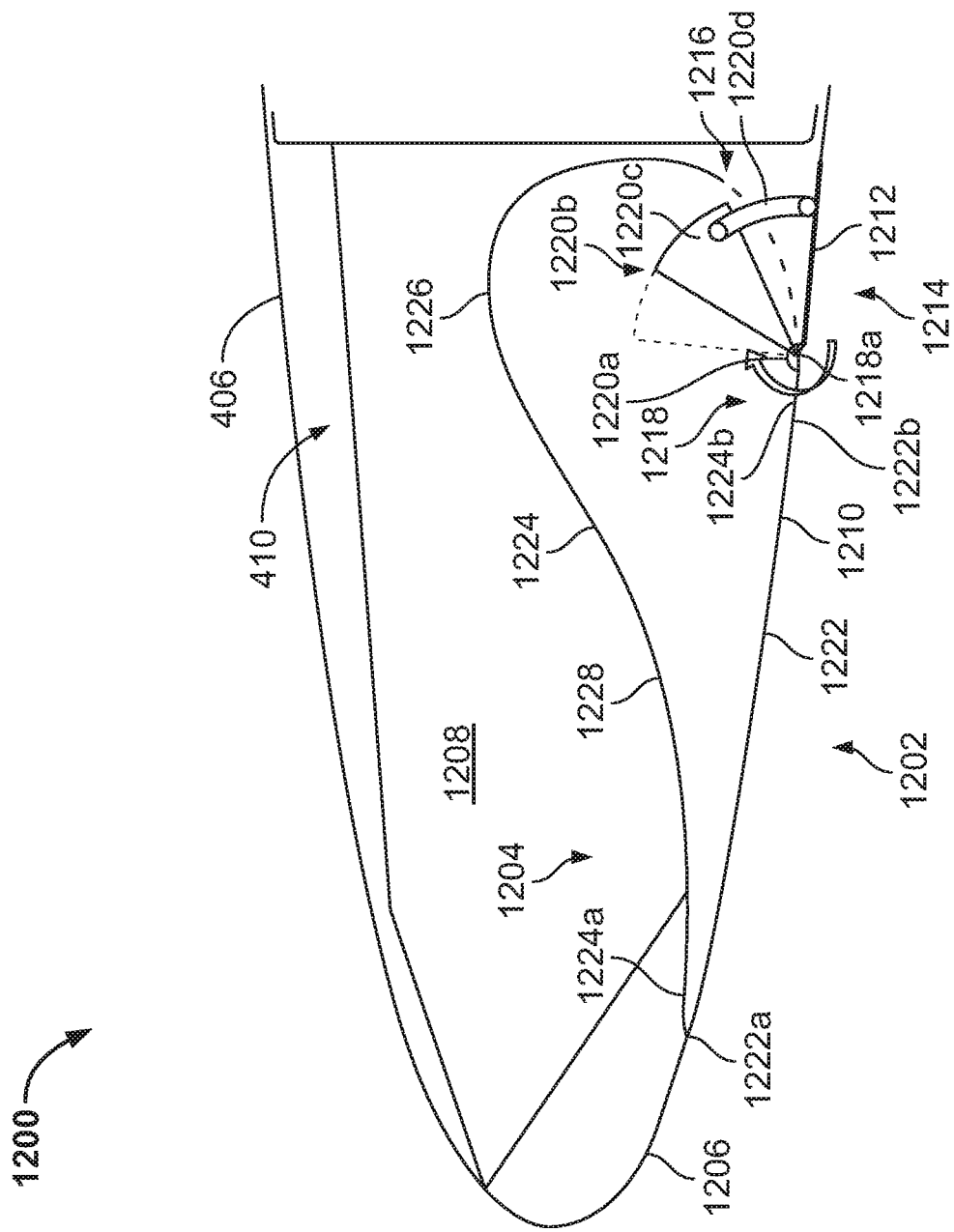
FIG. 12 is a schematic side view of another example high-lift system having another example Krueger flap disclosed herein that can implement the example aircraft of FIG. 1. The example Krueger flap of FIG. 12 is shown in an example stowed position.

FIG. 12 is a schematic cross-sectional view of another example high-lift system 1200 having an example Krueger flap 1202 disclosed herein. The example high-lift system 1200 of FIG. 12 can implement the example aircraft 100 of FIGS. 1 and 2. As shown in FIG. 12, the Krueger flap 1202 is in a stowed position 1204 relative to a fixed wing 406 of the high-lift system 1200. In the stowed position 1204, the Krueger flap 1202 is located at and/or on an underside and/or bottom surface 1206 of the fixed wing 406. For example, at least a portion of the Krueger flap 1202 is positioned in a cavity 1208 of the fixed wing 406 when the Krueger flap 1202 is in the stowed position 1204.

The Krueger flap 1202 is a multi-structure flap. For example, the Krueger flap 1202 includes a first flap portion 1210 (e.g., a fixed element) and a second flap portion 1212 (e.g., a rotating element). The first flap portion 1210 is movably (e.g., pivotally) coupled to the fixed wing 406 via the first actuation system 410, which moves the Krueger flap 1202 between the stowed position 1204 and a deployed position (e.g., the deployed position 1300 of FIG. 13). The second flap portion 1212 is movably (e.g., rotatably) coupled to the first flap portion 1210 between a first or extended position 1214 (e.g., a fully extended position) as shown in FIG. 12 in solid line and a second or retracted position 1216 (e.g., a fully retracted position) as shown in FIG. 12 in dashed line.

To move the second flap portion 1212 relative to the first flap portion 1210, the Krueger flap 1202 includes a second actuation system 1218. The second actuation system 1218 includes an actuator 1220a (e.g., a rotary actuator or motor) to move (e.g., rotate) the second flap portion 1212 relative to the first flap portion 1210. The actuator 1220a is coupled (e.g., fixed or connected) to the first flap portion 1210 and rotates the second flap portion 1212 relative to the first flap portion 1210 about an axis of rotation 1218a. To couple the second flap portion 1212 and the actuator 1220a, the second actuation system 1218 includes a drive 1220b (e.g., a bracket 1220c and a link 1220d). The bracket 1220c is coupled to the actuator 1220a and the link 1220d couples the bracket 1220c to the second flap portion 1212. For example, the actuator 1220a rotates the bracket 1220c in a first rotational direction (e.g., a clockwise direction in the orientation of FIG. 12) to move the second flap portion 1212 to the extended position 1214.

The first flap portion 1210 includes a fore surface or fore edge 1222 having a first end 1222a and a second end 1222b and an aft surface or aft edge 1224 having a first end 1224a and second end 1224b. The first ends 1222a, 1224a of the respective fore and aft edges 1222, 1224 are coupled or joined. The aft edge 1224 includes a first arcuate portion 1226 having a convex shape relative to a center of the Krueger flap 1202 (e.g., oriented in a direction toward the fore edge 1222) and a second arcuate portion 1228 having a concave shape relative to a center of the Krueger flap 1202 (e.g., oriented in a direction toward the fixed wing 406 or away from the fore edge 1222).

The fore edge 1222 is substantially planar (e.g., has a small amount of curvature) and the second flap portion 1212 has a substantially planar shape when the second flap portion 1212 is in the extended position 1214. To this end, the fore edge 1222 of the first flap portion 1210 and the second flap portion 1212, when in the extended position 1214, define an outer mold line (e.g., the bottom surface 1206) of the fixed wing 406 when the Krueger flap 1202 is in the stowed position 1204 and the second flap portion 1212 is in the extended position 1214.

Figure 13:
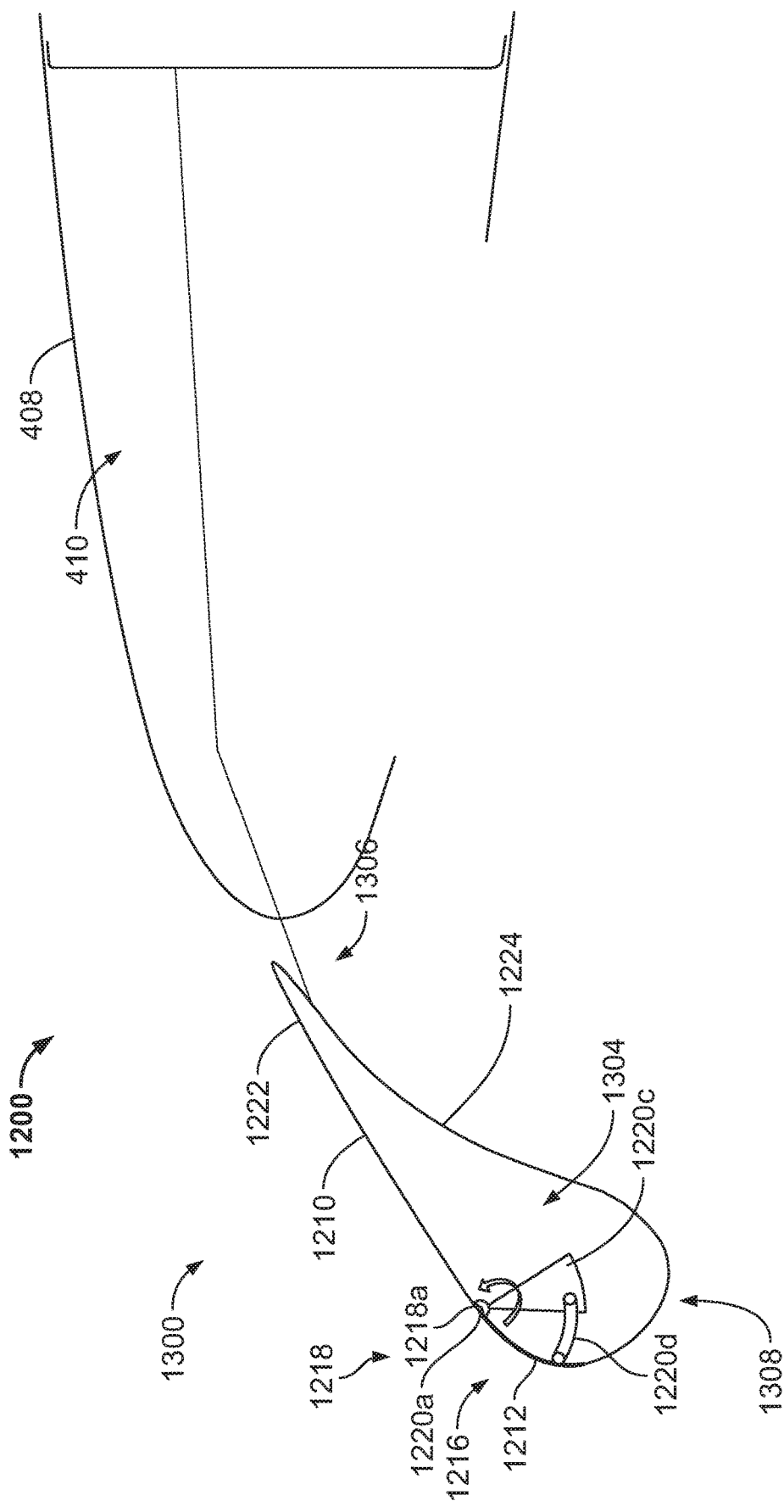
FIG. 13 is a schematic side view of the example high-lift system of FIG. 12 showing the Krueger flap in an example deployed position.

FIG. 13 shows the high-lift system 1200 in a deployed position 1300 and the Krueger flap 1202 in the retracted position 1216. In the deployed position 1300, (e.g., the aft edge 1224 of) the first flap portion 1210 fills a cove-region 1304 of the Krueger flap 1202 to reduce or eliminate flow recirculation within a channel or gap 1306 between the Krueger flap 1202 and the fixed wing 406. Additionally, the second flap portion 1212 is shown in the retracted position 1216 to form an aerodynamic surface 1308 (e.g., a bullnose) of the Krueger flap 1202. For example, the second flap portion 1212 couples the fore edge 1222 and the aft edge 1224 by providing a smooth continuous surface between fore edge 1222 and the aft edge 1224. In other words, the first flap portion 1210 and the second flap portion 1212 of the Krueger flap 1202 form the aerodynamic surface 1308 having a teardrop shaped profile (e.g., similar to the teardrop profile of FIGS. 3A and 3B) that increases a lift to drag ratio associated with the Krueger flap 1202. The aerodynamic surface 1308 of the Krueger flap 1202 is exposed to an airflow when the Krueger flap 1202 is in the deployed position 1300.

Referring to FIGS. 12 and 13, in operation, when the high-lift system 1200 is deployed, the Krueger flap 1202 is moved to the deployed position 1300 via the first actuation system 410. The first actuation system 410 moves the Krueger flap 1202 relative to the fixed wing 406 from the stowed position 1204 to the deployed position 1300. During movement of the Krueger flap 1202 toward the deployed position 1300 (or when the Krueger flap 1202 is at the deployed position 1300), the second actuation system 1218 rotates the second flap portion 1212 relative to the first flap portion 1210 from the extended position 1214 to the retracted position 1216. For example, to move the second flap portion 1212 to the retracted position 1216, the second actuation system 1218 rotates the second flap portion 1212 in a second rotational direction (e.g., a counterclockwise direction in the orientation of FIGS. 12 and 13) about the axis of rotation 1218a. A torque (e.g., in a counterclockwise direction about the pivot 1218a in the orientation of FIGS. 12 and 13) results in flexing of the second flap portion 1212 until the second flap portion 1212 engages (e.g., rests on) the first flap portion 1210.

To stow the high-lift system 1200, the first actuation system 410 moves the Krueger flap 1202 relative to the fixed wing 406 from the deployed position 1300 to the stowed position 1204. When the Krueger flap 1202 is in the stowed position 1204, the second actuation system 1218 rotates the second flap portion 1212 relative to the first flap portion 1210 to the extended position 1214. For example, to move the second flap portion 1212 to the extended position 1214, the second actuation system 1218 rotates the second flap portion 1212 in the first rotational direction (e.g., a clockwise direction in the orientation of FIGS. 12 and 13) about the axis of rotation 1218a. Specifically, the second actuation system 1218 releases a pressure on the second flap portion 1212 to enable the second flap portion 1212 to revert to the extended position 1214 (e.g., a neutral position) and sealing a gap on the bottom surface 1206 of the fixed wing 406 The fore edge 1222 of the first flap portion 1210, the second flap portion 1212 and the bottom surface 1206 of the fixed wing 406 form a smooth and continuous wing mold line when the high-lift system 1200 is in the stowed position 1204 and the second flap portion 1212 is in the extended position 1214.

The Krueger flap 1202 can be configured as a fixed camber Krueger flap with a rigid filler. The Krueger flap 1202 includes a small segment of an outer surface of the bullnose portion that is made of a flexible material configurable between an arcuate shape and a substantially planar shape. However, in some examples, the second flap portion 1212 can be implemented with shape memory alloy material(s). The shape memory alloy material can be configured to move the second flap portion 1212 to the extended position 1214 when the shape memory alloy is deenergized (e.g., via heat, electrical current, etc.) and move the second flap portion 1212 to the retracted position 1216 when the shape memory allow is energized (e.g., via heat, electrical current, etc.), or vice versa.

Figure 14:
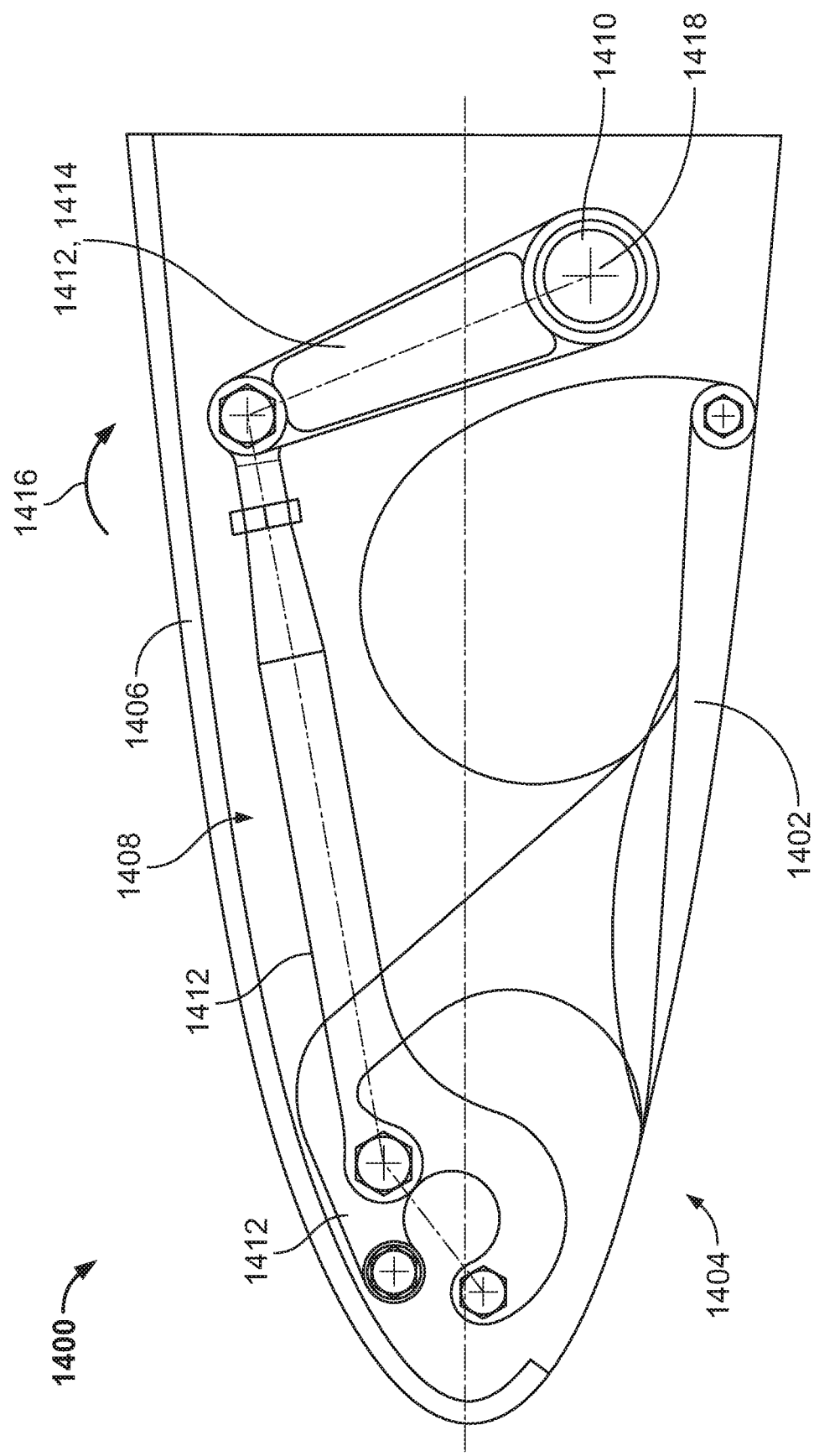
FIG. 14 is a schematic side view of another example high-lift system having an example first actuation system disclosed herein that can implement first actuation systems of the FIGS. 4-13. An example Krueger flap of FIG. 14 is shown in an example stowed position.

FIG. 14 is a schematic cross-sectional view of another example high-lift system 1400 and a Krueger flap 1402 disclosed herein. The Krueger flap 1402 is shown in a stowed position 1404 relative to a fixed wing 1406. Specifically, the high-lift system 1400 includes a first actuation system 1408 that can implement the first actuation system 410 of FIGS. 4-13. The first actuation system 1408 includes a drive 1410 (e.g. a motor or actuator) and a plurality of linkages 1412 that pivotally couple a Krueger flap 1402 to the fixed wing 1406. To move the Krueger flap 1402 to the stowed position 1404, the drive 1410 moves (e.g., rotates) a first linkage 1414 in a first rotational direction 1416 (e.g., a clockwise direction in the orientation of FIG. 14) about a first pivot axis 1418.

Figure 15:
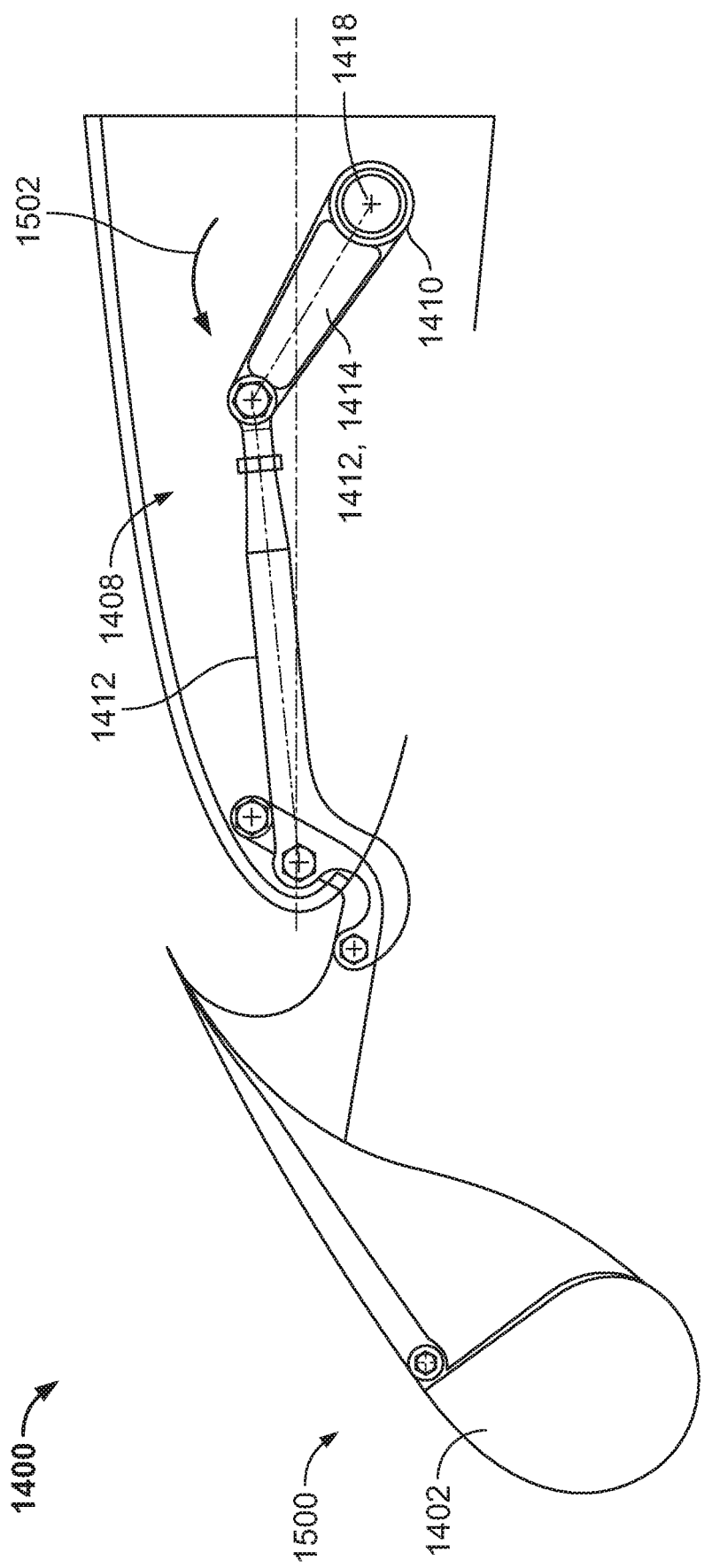
FIG. 15 is a schematic side view of the example high-lift system of FIG. 14 showing the Krueger flap in an example deployed position.

FIG. 15 illustrates the Krueger flap 1402 of FIG. 14 in a deployed position 1500. To move the Krueger flap 1402 to the deployed position 1500, the drive 1410 moves (e.g., rotates) the first linkage 1414 in a second rotational direction 1502 (e.g., a counterclockwise direction in the orientation of FIG. 15) about the first pivot axis 1418.

Although each example high-lift system and/or Krueger flap disclosed above has certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one of A and at least one of B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least A, (2) at least B, and (3) at least A and at least B. Similarly, as used herein in the context of describing the performance or execution of processes, instructions, actions, activities and/or steps, the phrase "at least one of A or B" is intended to refer to implementations including any of (1) at least A, (2) at least B, and (3) at least A and at least B.

From the foregoing, it will be appreciated that the disclosed Krueger flap apparatus and methods advantageously improve aerodynamics and/or handling of the aircraft in which the Krueger flap is implemented. For example, the Krueger flaps disclosed herein may advantageously provide for an increased lift to drag (L/D) ratio associated with an airfoil of the aircraft when the Krueger flap is in a deployed position. To facilitate storage of the Krueger flaps, the Krueger flaps disclosed herein include at least one flap portion movable relative to a second flap portion. Movably coupling the at least first flap portion and the second flap portion can vary (e.g., increase or decrease) a dimensional characteristic (e.g., a length) of the Krueger flap. This particular advantage provided by the disclosed Krueger flaps is not capable of being implemented via alternative lift enhancement devices (e.g., slats, airfoils having integrated drooped leading edges, etc.), as the portions of such alternative lift enhancement devices are not capable of being moved relative to each other.

In some examples, an apparatus includes a fixed wing and a Krueger flap movably coupled to the fixed wing between a stowed position and a deployed position. The Krueger flap includes a first flap portion movably coupled to the fixed wing and a second flap portion movable coupled to the first flap portion. The first flap portion moves relative to the second flap portion between a first position and a second position. The Krueger flap is to move to the first position in response to the Krueger flap moving to the stowed position. The Krueger flap is to move to the second position to define an aerodynamic surface in response to the Krueger flap moving to the deployed position.

In some examples, an end of the second flap portion overlap ends of the first flap portion when the second flap portion is in the first position.

In some examples, an end of the second flap portion matably engage ends of the first flap portion when the second flap portion is in the second position.

In some examples, an end of the second flap portion does not overlap ends of the first flap portion when the second flap portion is in the second position.

In some examples, the second flap portion slides relative to the first flap portion when the second flap portion moves relative to the first flap portion between the first position and the second position.

In some examples, the second flap portion rotates relative to the first flap portion when the second flap portion moves relative to the first flap portion between the first position and the second position.

In some examples, the apparatus includes a first actuation system supported by the fixed wing. The first actuation system is to move the Krueger flap between the deployed position and the stowed position.

In some examples, a second actuation system is supported by the Krueger flap. The second actuation system is to move the second flap portion relative to the first flap portion between the first position and the second position.

In some examples, wherein the second actuation system includes a linear actuator having a cylinder coupled to the first flap portion and a piston coupled to the second flap portion.

In some examples, wherein the second actuation system includes a rotary actuator to rotate the second flap portion relative to the first flap portion when the second flap portion moves relative to the first flap portion between the first position and the second position.

In some examples, wherein the first flap portion and the second flap portion form an aerodynamic surface of the Krueger flap when the second flap portion is in the second position relative to the first flap portion. The aerodynamic surface has a teardrop shaped profile. The teardrop shaped profile is to increase a lift to drag ratio associated with the Krueger flap.

In some examples, a third flap portion movably coupled to the first flap portion and the second flap portion.

In some examples, the third flap portion is movable relative to the first flap portion or the second flap portion between a third position and a fourth position.

In some examples, the first flap portion, the second flap portion, and the third flap portion form an aerodynamic surface of the Krueger flap when the second flap portion is in the second position relative to the first flap portion, and the third flap portion is in the fourth position relative to the second flap portion. The aerodynamic surface has a teardrop shaped profile.

In some examples, an apparatus includes a Krueger flap having a teardrop shaped aerodynamic surface. The Krueger flap including a first flap defining a first portion of the aerodynamic surface and a second flap movably coupled to the first flap between a first position and a second position. The second flap to move relative to the first position to facilitate storage of the Krueger flap in response to the Krueger flap moving toward a stowed position, the second flap to move to the second position to form the teardrop shaped aerodynamic surface of the Krueger flap in response to the Krueger flap moving toward a deployed position.

In some examples, the first flap and the second flap define a continuous surface when the second flap is in the second position.

In some examples, the second flap is to move to the second position relative to the first flap to define the aerodynamic surface of the Krueger flap, the second flap to move to the first position relative to the first flap.

In some examples, a third flap movably relative to the second flap between a third position and a fourth position, the first flap, the second flap and the third flap to define the teardrop shaped aerodynamic surface when the Krueger flap is in the deployed position, the second flap is in the second position and the third flap is in the fourth position.

In some examples, a method includes moving a Krueger flap relative to an airfoil between a stowed position and a deployed position; and moving a first flap of the Krueger flap relative to a second flap of the Krueger flap between a first position and a second position, the first flap and the second flap to form an aerodynamic surface of the Krueger flap having a teardrop shape profile in response to the Krueger flap moving to the deployed position and the second flap moving to the second position relative to the first flap.

In some examples, the method includes moving the Krueger flap relative to the airfoil via a first actuation system and moving the second flap of the Krueger flap relative to the first flap of the Krueger flap via a second actuation system different than the first actuation system.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus, comprising:
a fixed wing; and
a Krueger flap movably coupled to the fixed wing between a stowed position and a deployed position, the Krueger flap including:
a first flap portion movably coupled to the fixed wing; and
a second flap portion movable coupled to the first flap portion, the first flap portion moves relative to the second flap portion between a retracted position and an extended position, the first flap portion to move to the retracted position in response to the Krueger flap moving to the stowed position, wherein an end of the second flap portion overlaps ends of the first flap portion when the second flap portion is in the retracted position, and the first flap to move to the extended position to define an aerodynamic surface in response to the Krueger flap moving to the deployed position.

2. The apparatus of claim 1, wherein the end of the second flap portion matably engages the ends of the first flap portion when the second flap portion is in the extended position.

3. The apparatus of claim 1, wherein the end of the second flap portion does not overlap the ends of the first flap portion when the second flap portion is in the extended position.

4. The apparatus of claim 1, wherein the second flap portion slides relative to the first flap portion when the second flap portion moves relative to the first flap portion between the retracted position and the extended position.

5. The apparatus of claim 1, wherein the second flap portion rotates relative to the first flap portion when the second flap portion moves relative to the first flap portion between the retracted position and the extended position.

6. The apparatus of claim 1, further including a first actuation system supported by the fixed wing, the first actuation system to move the Krueger flap between the deployed position and the stowed position, and a second actuation system supported by the Krueger flap, the second actuation system to move the second flap portion relative to the first flap portion between the retracted position and the extended position.

7. The apparatus of claim 6, wherein the second actuation system includes at least one of a linear actuator having a first end coupled to the first flap portion and a second end coupled to the second flap portion or a rotary actuator to rotate the second flap portion relative to the first flap portion when the second flap portion moves relative to the first flap portion between the retracted position and the extended position.

8. The apparatus of claim 1, wherein the aerodynamic surface of the Krueger flap has a teardrop shaped profile, wherein the teardrop shaped profile is to increase a lift to drag ratio associated with the Krueger flap.

9. The Apparatus of claim 1, wherein the first flap includes a fore surface having a first end and a second end opposite the first end and an aft surface having a third end and a fourth end opposite the third end.

10. The apparatus of claim 9, wherein the first end is coupled to the third end, and the second end is spaced from the fourth end.

11. The apparatus of claim 10, wherein the second flap overlaps the second end of the fore surface and the fourth end of the aft surface when the second flap is in the retracted position.

12. An apparatus, comprising:
a fixed wing; and
a Krueger flap movably coupled to the fixed wing between a stowed position and a deployed position, the Krueger flap including:
a first flap portion movably coupled to the fixed wing; and
a second flap portion movable coupled to the first flap portion, the first flap portion moves relative to the second flap portion between a retracted position and an extended position, the first flap portion to move to the retracted position in response to the Krueger flap moving to the stowed position, and the first flap to move to the extended position to define an aerodynamic surface in response to the Krueger flap moving to the deployed position;
a first actuation system supported by the fixed wing, the first actuation system to move the Krueger flap between the deployed position and the stowed position; and
a second actuation system supported by the Krueger flap, the second actuation system to move the second flap portion relative to the first flap portion between the retracted position and the extended position.

13. The apparatus of claim 12, wherein the second actuation system includes a linear actuator having a first end coupled to the first flap portion and a second end coupled to the second flap portion.

14. The apparatus of claim 12, wherein the second actuation system includes a rotary actuator to rotate the second flap portion relative to the first flap portion when the second flap portion moves relative to the first flap portion between the retracted position and the extended position.

15. An apparatus comprising:
a Krueger flap having a teardrop shaped aerodynamic surface, the Krueger flap including:
a first flap defining a first portion of the aerodynamic surface, the first flap including a fore surface defining a first end and a second end, and an aft surface defining a third end and a fourth end, wherein the first end of the fore surface is coupled to the third end of the aft surface, and wherein the second end of the fore surface is spaced from the fourth end of the aft surface; and
a second flap movably coupled to the first flap between a first position and a second position, the second flap to move to relative to the first flap to facilitate storage of the Krueger flap in response to the Krueger flap moving toward a stowed position, the second flap to move to the second position to form the teardrop shaped aerodynamic surface of the Krueger flap in response to the Krueger flap moving toward a deployed position, wherein the fore surface of the first flap, the aft surface of the first flap and the second flap define the teardrop shaped aerodynamic surface when the Krueger flap is in the deployed position.

16. The apparatus of claim 15, wherein the first flap and the second flap define a continuous surface when the second flap is in the second position.

17. The apparatus of claim 15, wherein the aft surface is a third flap movably coupled to the first flap and the second flap.

18. The apparatus of claim 17, wherein the third flap is movable relative to the first flap or the second flap between a third position and a fourth position.

19. The apparatus of claim 17, wherein the third flap is an inflatable bladder.

20. A method, comprising:
moving a Krueger flap relative to a fixed wing between a stowed position and a deployed position;
moving a first flap of the Krueger flap relative to a second flap of the Krueger flap between a first position and a second position, the first flap and the second flap to form an aerodynamic surface of the Krueger flap having a teardrop shape profile in response to the Krueger flap moving to the deployed position and the second flap moving to the second position relative to the first flap; and
moving the Krueger flap relative to the fixed wing via a first actuation system and moving the second flap of the Krueger flap relative to the first flap of the Krueger flap via a second actuation system different than the first actuation system.

\* \* \* \* \*